(12) United States Patent
Takagi et al.

(10) Patent No.: US 6,283,088 B1
(45) Date of Patent: Sep. 4, 2001

(54) METHOD AND APPARATUS FOR PROCESSING VAPOR FUEL OF LEAN-BURN INTERNAL COMBUSTION ENGINE

(75) Inventors: Naoya Takagi, Susono; Yoshihiko Hyodo, Gotenba, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/335,795

(22) Filed: Jun. 18, 1999

(30) Foreign Application Priority Data

Jul. 15, 1998 (JP) .................................................. 10-200579

(51) Int. Cl.[7] ............................. F02B 17/00; F02M 25/08
(52) U.S. Cl. ........................ 123/295; 123/301; 123/302; 123/308; 123/520
(58) Field of Search ................................. 123/295, 301, 123/302, 306, 308, 518, 519, 520

(56) References Cited

U.S. PATENT DOCUMENTS

| 4,494,504 | 1/1985 | Yagi et al. ............................ 123/308 |
| 5,245,975 | * 9/1993 | Ito ........................................ 123/520 |
| 5,363,832 | 11/1994 | Suzumura et al. ................... 123/704 |
| 5,531,193 | 7/1996 | Nakamura .......................... 123/90.15 |
| 5,706,789 | * 1/1998 | Yamada et al. ....................... 123/520 |
| 5,727,531 | * 3/1998 | Osanai .................................. 123/520 |
| 5,765,372 | * 6/1998 | Mitobe et al. .................... 123/585 X |
| 5,826,565 | * 10/1998 | Mueller et al. ................... 123/302 X |

FOREIGN PATENT DOCUMENTS

| 196 17 386 C1 | 7/1997 | (DE) . | |
| 2327983 | * 2/1999 | (GB) | .................................. 123/295 |
| 4-194354 | 7/1992 | (JP) . | |
| 6-241124 | * 8/1994 | (JP) | ..................................... 123/520 |
| 7-189820 | 7/1995 | (JP) . | |
| 10-331728 | 12/1998 | (JP) . | |

* cited by examiner

Primary Examiner—Tony M. Argenbright
(74) Attorney, Agent, or Firm—Oliff & Berridge, PLC

(57) ABSTRACT

A cylinder injection type lean-burn internal combustion engine is capable of executing the purging of a vapor fuel without disturbing a state of an air-fuel mixture in a combustion chamber. The vapor fuel produced in a fuel tank is guided to a purge port provided at an intake passageway of the lean-burn internal combustion engine, and subsequently supplied along an intake air swirl flow into the combustion chamber. The vapor fuel is thereby partially concentrated in any one of a combustible air-fuel mixture layer and an air layer in the combustion chamber.

20 Claims, 14 Drawing Sheets

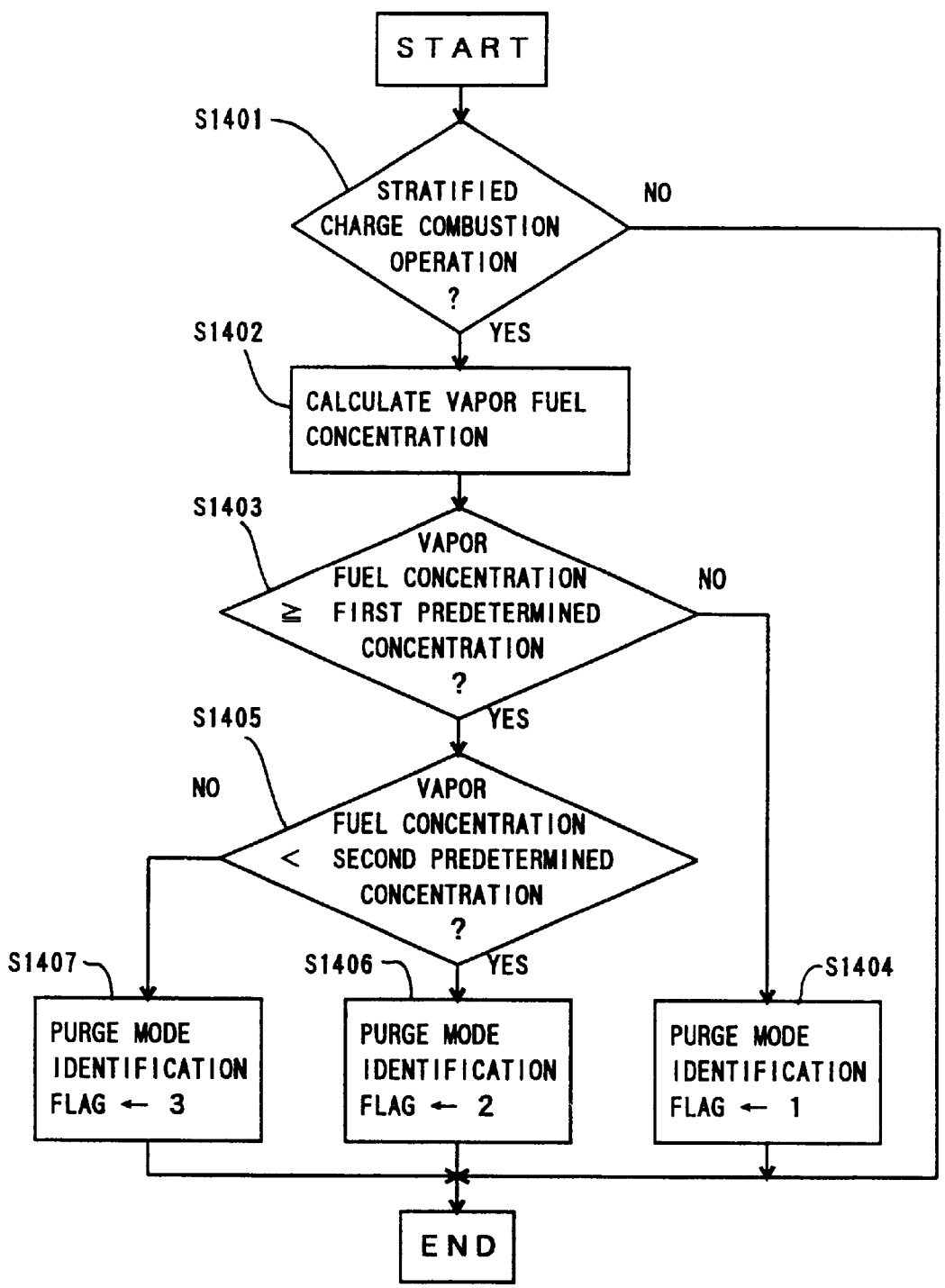

METHOD AND APPARATUS FOR PROCESSING VAPOR FUEL OF LEAN-BURN INTERNAL COMBUSTION ENGINE

BACKGROUND OF THE INVENTION

The present invention relates generally to an apparatus for processing a vapor fuel of a lean-burn internal combustion engine capable of burning an air-fuel mixture which is in an over-oxygen state, and more particularly to a technology of processing the vapor fuel without disturbing a state of the air-fuel mixture when executing a lean-burn.

In an internal combustion engine mounted in an automobile and the like, for reducing a fuel consumption, there has been increasingly developed in recent years a lean-burn internal combustion engine capable of burning an air-fuel mixture of which an air-fuel ratio is higher than a theoretical air/fuel ratio (which implies an over-oxygen state). What is known as this type of lean-burn internal combustion engine is, e.g., a cylinder injection type lean-burn internal combustion engine, wherein a fuel injection valve is attached so that an injection hole thereof faces an interior of a combustion chamber.

The cylinder injection type internal combustion engine is constructed such that fresh air is, in a low-load operation region, introduced into the combustion chamber at an intake stroke, and at a subsequent compression stroke the fuel is injected from the fuel injection valve, and a combustible air-fuel mixture is formed only in the vicinity of a spark plug. That is, the air-fuel mixture in the combustion chamber is brought into so-called a stratified state in which a combustible air-fuel mixture layer is present in the vicinity of the spark plug, and an air layer is present in other areas. The stratified air-fuel mixture is burned, wherein the combustible air-fuel mixture layer being present around the spark plug serves as an ignition source.

Further, the cylinder injection type internal combustion engine is constructed such that the fresh air is, in an intermediate-load operation region, introduced into the combustion chamber at the intake stroke, and simultaneously the fuel is injected from the fuel injection valve. On this occasion, a quantity of the fuel injected from the fuel injection valve is such a quantity that a ratio of the fresh air to the fuel quantity (which is so-called an air-fuel ratio) is higher than a theoretical air-fuel ratio. In this case, there is formed a lean air-fuel mixture in which the fuel is uniformly mixed with the fresh air substantially over the entire area within the combustion chamber.

Further, according to the cylinder injection type internal combustion engine, in a high-load operation region, the fresh air is introduced into the combustion chamber at the intake stroke, and the fuel is injected from the fuel injection valve. On this occasion, the quantity of the fuel injected from the fuel injection valve is such a quantity that the ratio of the fresh air to the fuel quantity (which is so-called the air-fuel ratio) is substantially equal to the theoretical air-fuel ratio. In this case, there is formed a stoichiometric air-fuel mixture in which the fuel is uniformly mixed with the fresh air over the entire area within the combustion chamber.

As described above, the cylinder injection type internal combustion engine is capable of actualizing the lean burn in the low- and intermediate-load operation regions, whereby the fuel consumption can be largely reduced.

On the other hand, the internal combustion engine is provided in combination with a vapor fuel processing apparatus for processing the vapor fuel produced in a fuel tank and the like. This vapor fuel processing apparatus is constructed of a charcoal canister for temporarily reserving the vapor fuel produced in the fuel tank, an atmospheric air introducing passageway for introducing the atmospheric air into the charcoal canister, a negative pressure introducing passageway for introducing into the charcoal canister an intra intake pipe negative pressure produced in an intake passageway disposed downstream of a throttle valve, and a flow rate control valve provided at the negative pressure introducing passageway.

In the thus constructed vapor fuel processing apparatus, when the flow rate control valve is closed, the vapor fuel produced in the fuel tank is adsorbed to an adsorbent such as an activated carbon and the like charged in the charcoal canister.

In the vapor fuel processing apparatus, when the flow rate control valve is opened, the intra intake pipe negative pressure produced in the intake passageway is applied to the charcoal canister via the negative pressure introducing passageway. When the intra intake pipe negative pressure is applied to the charcoal canister, the atmospheric air is sucked into the charcoal canister via the atmospheric air introducing passageway, and subsequently sucked into the intake passageway via the negative pressure introducing passageway. Thus, according to the vapor fuel processing apparatus, when the flow rate control valve is opened, there is formed a flow of the atmospheric air flowing through the charcoal canister.

With the through-flow of the atmospheric air, the vapor fuel which has been adsorbed to the adsorbent desorbs therefrom and is guided together with the atmospheric air to the intake passageway. The vapor fuel and the atmospheric air guided to the intake passageway are further guided to the combustion chamber of the internal combustion engine while being mixed with the fresh air flowing from upstream of the intake passageway. Then, the vapor fuel and atmospheric air are, together with the fuel injected from the fuel injection valve, are burned and processed.

Here, it can be considered that the vapor fuel processing apparatus is applied to the cylinder injection type internal combustion engine. However, in this case, if the vapor fuel is introduced into the intake passageway from the charcoal canister when the cylinder injection type internal combustion engine is in a stratified charge combustion operational state, the inside of the combustion chamber is not developed into a stratified state, or alternatively a combustible air-fuel mixture layer becomes an over-fuel state, because the vapor fuel is supplied into the combustion chamber while being mixed with the fresh air. Thus, it is possible to cause deteriorations of a combustion state and of an emission to out of an allowable level.

To cope with such a problem, there has hitherto been proposed a cylinder injection type internal combustion engine disclosed in Japanese Patent Application Laid-Open Publication No.4-194354. In this cylinder injection type internal combustion engine, the vapor fuel is supplied to the intake passageway only when the engine load is larger than a predetermined qualified load. That is, the vapor fuel is supplied to the intake passageway only when the internal combustion engine is in a uniform combustion operational state, and the vapor fuel is to be processed without destabilizing the combustion.

However, the cylinder injection type internal combustion engine disclosed in the above-mentioned Japanese Patent Application Laid-Open Publication No.4-194354 executes the purging of the vapor fuel so long as the engine operational state is in a uniform combustion operation region, and is, therefore, incapable of processing all the vapor fuel reserved in the charcoal canister, and the charcoal canister might be saturated.

SUMMARY OF THE INVENTION

It is a primary object of the present invention, which was devised to obviate the problems described above, to provide a lean-burn internal combustion engine capable of burning an air-fuel mixture which is in an over-oxygen state, and a technology capable of executing the purging of a vapor fuel without disturbing a state of the air-fuel mixture in a combustion chamber during a lean-burn operation (a stratified charge combustion operation), particularly in a cylinder injection type lean-burn internal combustion engine, whereby the vapor fuel is processed at a high efficiency without deteriorating the combustion state or the emission to out of the allowable level.

To accomplish the above object, the present invention adopts the following means.

According to a first aspect of the present invention, a method of processing a vapor fuel of a lean-burn internal combustion engine, comprises a step of guiding a vapor fuel generated in a fuel tank provided in combination in the lean-burn internal combustion engine, to an intake passageway of the lean-burn internal combustion engine; a step of generating a swirl flow of intake air, ranging from the intake passageway to a combustion chamber; and a step of forming a partially-concentrated gas containing the vapor fuel in the combustion chamber by supplying the combustion chamber with the vapor fuel guided to the intake passageway along the intake air swirl flow.

According to this method, the vapor fuel produced in the fuel tank is guided to the intake passageway of the lean-burn internal combustion engine. The vapor fuel guided to the intake passageway is guided along the intake air swirl flow to the combustion chamber of the lean-burn internal combustion engine, thereby forming the partially-concentrated gas in the combustion chamber.

As a result, when the lean-burn internal combustion engine is a cylinder injection type internal combustion engine which burns the air-fuel mixture separated into the combustible air-fuel mixture layer and the air layer, and is capable of providing so-called a stratified charge combustion operation, it follows that the vapor fuel presents partially in one of the combustible air-fuel mixture layer and the air layer, and the stratified state in the combustion chamber is not disturbed. Namely, even if the vapor fuel is purged when the lean-burn internal combustion engine is in a lean-burn operational state (a stratified charge combustion operational state), the state of the air-fuel mixture in the combustion chamber is not disturbed.

Note that the term "the swirl flow" used herein may embrace a swirl flow swirling around the plane perpendicular to an axial direction of the cylinder, a tumble flow swirling around in the axial direction of the cylinder, or a combination of the swirl flow and the tumble flow.

According to a second aspect of the present invention, an apparatus for processing a vapor fuel of a lean-burn internal combustion engine, comprises a lean-burn internal combustion engine capable of burning an air-fuel mixture which is in an over-oxygen state; purge control means for guiding a vapor fuel generated in a fuel tank provided in combination in the lean-burn internal combustion engine, to an intake passageway of the lean-burn internal combustion engine; swirl flow generating means for generating a swirl flow of intake air, ranging from the intake passageway to a combustion chamber; and partially-concentrated gas forming means for forming a partially-concentrated gas containing the vapor fuel in the combustion chamber by supplying an interior of the combustion chamber with the vapor fuel which has been guided to the intake passageway along the intake air swirl flow.

In the thus constructed vapor fuel processing apparatus, the purge control means guides the vapor fuel produced in the fuel tank to the intake passageway of the lean-burn internal combustion engine. Then, the partially-concentrated gas forming means supplies the combustion chamber with the vapor fuel which has been guided to the intake passageway along the swirl flow formed by the swirl flow forming means, and thus forms the partially-concentrated gas in the combustion chamber.

As a result, when the lean-burn internal combustion engine is the cylinder injection type internal combustion engine capable of providing the stratified charge combustion operation, it follows that the vapor fuel presents partially in one of the combustible air-fuel mixture layer and the air layer, and the stratified state in the combustion chamber is not disturbed.

Hence, with the vapor fuel processing apparatus of the lean-burn internal combustion engine according to the present invention, in respect of the lean-burn internal combustion engine, especially the cylinder injection type lean-burn internal combustion engine, the vapor fuel can be purged without disturbing the state of the air-fuel mixture not only in the uniform combustion operation state, but also in the stratified charge combustion operation state. It is, therefore, feasible to process the vapor fuel at a high efficiency without causing deterioration of the combustion state or of the emission to out of the allowable level.

The vapor fuel processing according to the second aspect of the invention may further comprise fuel supply state control means for controlling at least either the purge device or the fuel injection valve in order to mix the partially-concentrated gas with the fuel injected from the fuel injection valve. In this case, the air-fuel mixture in the combustion chamber is stratified into the combustible air-fuel mixture layer composed of the partially-concentrated gas and the injection fuel, and the air layer.

The vapor fuel processing apparatus according to the second aspect may still further comprise vapor fuel concentration detecting means for detecting a concentration of the vapor fuel, and fuel supply state control means for controlling, when the concentration detected by the vapor fuel concentration detecting means is less than a predetermined concentration, at least either the purge control means or the fuel injection valve in order to mix the partially-concentrated gas with the fuel injected from the fuel injection valve, and controlling, when the concentration detected by the vapor fuel concentration detecting means is over the predetermined concentration, at least either the purge control unit or the fuel injection valve in order to form such a partially-concentrated gas that the above partially-concentrated gas and the fuel injected from the fuel injection valve are present independently of each other.

This is because if the combustible air-fuel mixture layer is formed by mixing the partially-concentrated gas with the injection fuel when the concentration of the vapor fuel is over the predetermined concentration, the combustible air-fuel mixture layer is brought into an over-fuel state, which might induce an accidental fire and the like.

According to a third aspect of the present invention, an apparatus for processing a vapor fuel of a lean-burn internal combustion engine, comprises a lean-burn internal combustion engine capable of burning an air-fuel mixture which is in an over-oxygen state, and purge control means for guiding a vapor fuel generated in a fuel tank provided in combination in the lean-burn internal combustion engine, to a purge port provided at an intake passageway of the lean-burn internal combustion engine. The purge port may be disposed in a position at which the vapor fuel guided by the purge control means is not mixed with intake air and a partially-concentrated gas is formed in the combustion chamber of the lean-burn internal combustion engine.

In the cylinder injection type lean-burn internal combustion engine capable of providing so-called the stratified charge combustion in which to burn the air-fuel mixture which is separated into the combustible air-fuel mixture layer and the air layer, wherein the vapor fuel forms the partially-concentrated gas in the combustion chamber, the vapor fuel processing apparatus of the above-described structure is capable of making the partially-concentrated gas containing the vapor fuel present in either the combustible air-fuel mixture layer or the air layer. In consequence, even when the vapor fuel is purged during the stratified charge combustion operation of the lean-burn internal combustion engine, it never occurs that the state of the air-fuel mixture in the combustion chamber is disturbed.

The vapor fuel processing apparatus according to the third aspect of the invention may further comprise fuel supply state control means for controlling at least either the purge means or the fuel injection valve in order to mix the partially-concentrated gas and the fuel injected from the fuel injection valve. In this case, the combustible air-fuel mixture layer is formed by mixing the partially-concentrated gas with the fuel injected from the fuel injection valve, and, therefore, the stratified state is kept in the combustion chamber.

The vapor fuel processing apparatus according to the third aspect may further comprise vapor fuel concentration detecting means for detecting a concentration of the vapor fuel, and fuel supply state control means for controlling, when the concentration detected by the vapor fuel concentration detecting means is less than a predetermined concentration, at least either the purge control means or the fuel injection valve in order to mix the partially-concentrated gas with the fuel injected from the fuel injection valve, and controlling, when the concentration detected by the vapor fuel concentration detecting means is over the predetermined concentration, at least either the purge control means or the fuel injection valve in order to form a partially-concentrated gas in which the above partially-concentrated gas and the fuel injected from the fuel injection valve are present independently of each other.

The vapor fuel processing apparatus according to the third aspect may further comprise purge restricting means for restricting the purging of the vapor fuel, when the concentration detected by the vapor fuel concentration detecting means is over a predetermined concentration, and combustion mode changing means for changing a combustion mode of the lean-burn internal combustion engine, when the concentration detected by the vapor fuel concentration detecting means is over a predetermined concentration.

When the lean-burn internal combustion engine includes swirl flow generating means for generating a swirl flow of intake air in the combustion chamber, the purge control means may be adapted to control the purging of the vapor fuel in accordance with a state of the swirl flow.

Further, when the lean-burn internal combustion engine includes a variable valve timing mechanism for making variable an opening/closing timing of at least either an intake valve or an exhaust valve, the purge control means unit may be adapted to change-over the purge execution timing in accordance with an overlap timing of the intake valve with the exhaust valve. In this case, the purge control means may be adapted to control the purge execution timing so that the overlap timing between, for example, the intake/exhaust valves is not synchronous with the purge execution timing, thereby to prevent deterioration of the emission of the exhaust gas to out of the allowable level, and to prevent disturbance of the air-fuel ratio due to a back-flow of the purge gas to the intake passageway or an outflow to the exhaust passageway.

According to a fourth aspect of the present invention, an apparatus for processing a vapor fuel of a lean-burn internal combustion engine comprises a lean-burn internal combustion engine including a plurality of cylinders and capable of burning an air-fuel mixture which is in an over-oxygen state; and purge control means for guiding a vapor fuel generated in a fuel tank provided in combination in the lean-burn internal combustion engine, to an intake passageway of the lean-burn internal combustion engine. The purge control means may supply the vapor fuel to only a specified cylinder among the plurality of cylinders. In this case, for instance, when the lean-burn internal combustion engine is in the stratified charge combustion operational state, the uniform combustion takes place in only one cylinder, and the vapor fuel can be purged with respect to only this cylinder, whereby the combustion state of the lean-burn internal combustion engine can be stabilized.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent from the following discussion in conjunction with the accompanying drawings, in which:

FIG. 14 is a flowchart showing a purge execution mode judging routine.

DESCRIPTION OF THE PREFERRED EMBODIMENTS

Preferred embodiments of a vapor fuel processing apparatus according to the present invention, will hereinafter be described with reference to the accompanying drawings.

<First Embodiment>

Figure 1:
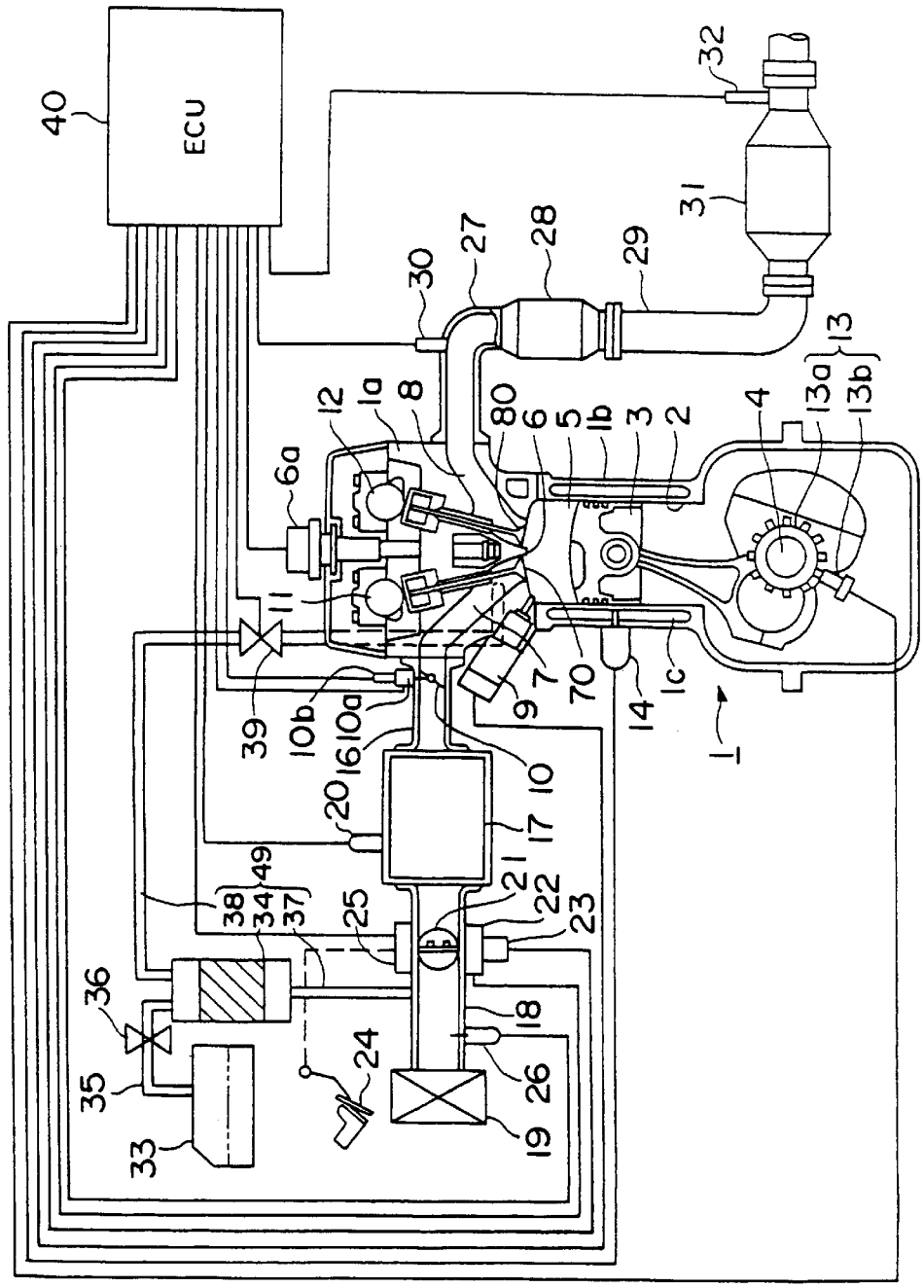
FIG. 1 is a diagram schematically illustrating a construction of a lean-burn internal combustion engine to which a vapor fuel processing apparatus of the present invention is applied.

FIG. 1 is a view schematically showing a construction of an internal combustion engine to which the vapor fuel processing apparatus of the present invention is applied. An internal combustion engine 1 shown in FIG. 1 is a 4-cycle cylinder fuel injection type internal combustion engine including a plurality of cylinders 2 and a fuel injection valve 9 for injecting a fuel directly into each cylinder 2.

The internal combustion engine 1 has a cylinder block 1b provided with the plurality of cylinders 2 and formed with a cooling water passageway 1c, and a cylinder head 1a fixed to an upper portion of the cylinder block 1b.

A crank shaft 4, which is an engine output shaft, is rotatably supported in the cylinder block 1b, and is connected to a piston 3 slidably inserted into each of the cylinders 2.

A combustion chamber 5 defined by a top surface of the piston 3 and by the cylinder head 1a, is formed above the piston 3. The cylinder head 1a is fitted with a spark plug 6 so as to face the combustion chamber 5, and an igniter 6a for applying a drive current to the spark plug 6 is connected to the spark plug 6.

Further, the cylinder head 1a is so formed with two intake ports 7 and two exhaust ports 8 with their open ends facing the combustion chamber 5, and a fuel injection valve 9 is so fitted to the cylinder head 1a as to have an injection hole thereof face the combustion chamber 5.

An intake valve 70 and an exhaust valve 80 for opening and closing the open ends of the intake and exhaust ports 7, 8, are so supported on the cylinder head 1a as to be movable in advancing and retreating directions. Those intake and exhaust valves 70, 80 are movably driven to advance and retreat by an intake-side cam shaft 11 and an exhaust-side cam shaft 12, both of which are rotatably supported on the cylinder head 1a.

The intake-side cam shaft 11 and the exhaust-side cam shaft 12 are connected to the crank shaft 4 via an unillustrated timing belt, whereby a rotational torque of the crank shaft 4 is transmitted via the timing belt to the intake-side cam shaft 11 and the exhaust-side cam shaft 12.

One intake port 7 of the two intake ports 7 communicating with the respective cylinders 2 is constructed of a straight port having a passageway extending straight from the open end formed in an outer wall of the cylinder head 1a to the open end of the intake port 7 facing the combustion chamber 5. The other intake port 7 is constructed of a helical port having a passageway helically, on the plane perpendicular to an axial direction of the cylinder 2, extending from the open end in the outer wall of the cylinder head 1a to the open end of that intake port 7 facing the combustion chamber 5.

The respective intake ports 7 communicate with intake branch pipes 16 fitted to the cylinder head 1a. The branch pipe 16, which is communicating with the straight port of the two intake ports 7, is provided with a swirl control valve 10 for controlling a flow rate in the branch pipe. Secured to the swirl control valve 10 are an actuator 10a, constructed of a step motor and the like, for opening and closing the swirl control valve 10 in accordance with an applied current, and an SCV position sensor 10b for outputting an electric signal corresponding to an opening degree of the swirl control valve 10.

The intake branch pipe 16 is connected to a surge tank 17, and the surge tank 17 is connected via an intake pipe 18 to an air cleaner box 19. A vacuum sensor 20 for outputting an electric signal corresponding to a pressure in the surge tank 17, is attached to the surge tank 17.

The intake pipe 18 is fitted with a throttle valve 21 for controlling a flow rate in the intake pipe 18. The throttle valve 21 is fitted with an actuator 22 constructed of a step motor and the like for opening and closing the throttle valve 21 in accordance with an applied current, and also fitted with a throttle position sensor 23 for outputting an electric signal corresponding to an opening degree of the throttle valve 21.

Moreover, the throttle valve 21 is provided in combination with an accelerator lever (not shown) which rotates interlocking with an accelerator pedal 24. An accelerator position sensor 25 for outputting an electric signal corresponding to a rotational position (a pedaling quantity of the accelerator pedal 24) of the accelerator lever, is fitted to the accelerator lever.

An airflow meter 26 for outputting an electric signal corresponding to a mass of fresh air (which is referred to as an intake air mass) flowing through within the intake pipe 18, is provided at a portion of the intake pipe 18 which is located upstream of the throttle valve 20.

On the other hand, each exhaust port 8 communicates with each of exhaust branch pipes 27 attached to the cylinder head 1a, and this exhaust branch pipe 27 is connected via a first catalyst 28 to an exhaust pipe 29. The exhaust pipe 29 is connected at its downstream to an unillustrated silencer.

The exhaust branch pipe 27 is fitted with a first air/fuel ratio sensor 30 for outputting an electric signal corresponding to an air/fuel ratio of an exhaust gas flowing through the exhaust branch pipe 27.

A second catalyst 31 is provided midways of the exhaust pipe 29, and a second air/fuel ratio sensor 32 for outputting an electric signal corresponding to the air/fuel ratio of the exhaust gas flowing from the second catalyst 31, is provided at a portion of the exhaust pipe 29, which is located more downstream than the second catalyst 31.

The first catalyst 28 is a three-way (ternary) catalyst of which a capacity is smaller than that of the second catalyst 31, and the second catalyst 31 is the three-way catalyst or a nitrogen oxide occlusion reducing type catalyst.

Next, the internal combustion engine 1 is provided in combination with a fuel tank 33 and a charcoal canister 34 for temporarily storing a vapor fuel generated in the fuel tank 33. The fuel tank 33 and the charcoal canister 34 are connected to each other via the vapor fuel passageway 35. An intra-tank pressure control valve 36 for opening and closing a flow path in the vapor fuel passageway 35, is attached midways of the vapor fuel passageway 35.

The intra-tank pressure control valve 36 is constructed of a combination of a positive pressure valve and a negative pressure valve. The positive pressure valve opens when a pressure in the fuel tank 33 becomes a first predetermined value or larger with an increase in the vapor fuel, while the negative pressure valve opens when the pressure in the fuel tank 33 becomes a second predetermined value (<the first predetermined value) or smaller with a decrease of the fuel.

An atmospheric air introducing passageway 37 is connected to the charcoal canister 34 and further connected to an intake pipe 18 positioned between the airflow meter 26 and the throttle valve 21.

Figure 2:
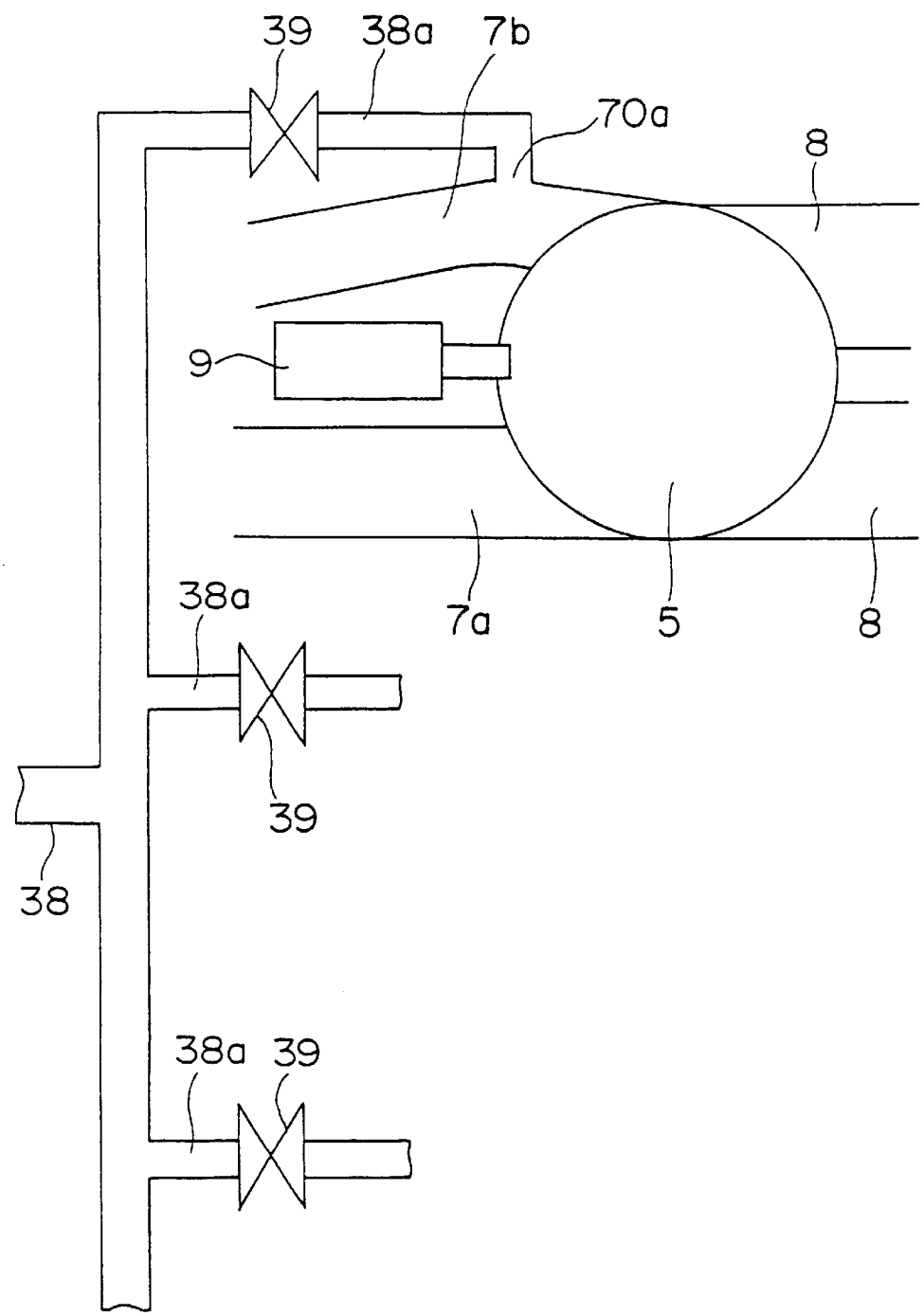
FIG. 2 is a plan view showing a configuration of a connecting portion between a purge passageway and an intake port.

A negative pressure introducing passageway 38 is connected to the charcoal canister 34, and is diverged into branch pipes 38a in the number corresponding to the number of the cylinders of the internal combustion engine 1, and each branch pipe 38a is connected to the intake port of each cylinder 2. More specifically, each branch pipe 38a of the negative pressure introducing passageway 38, as shown in FIG. 2, communicates with a purge port 70a formed facing the intake port 7 located in the vicinity of the intake valve 70.

An electromagnetic valve 39 for controlling a flow rate in the branch pipe 38a, is attached midways of each of the branch pipes 38a. This electromagnetic valve 39 is controlled based on a drive pulse signal having a duty ratio corresponding to a ratio of a valve opening time to a valve closing time. Then, the electromagnetic valve 39 is fully closed when the drive pulse signal corresponding to a duty ratio of, e.g., 0% is applied thereto, and is fully opened when the drive pulse signal corresponding to a duty ratio of 100% is applied thereto.

Note that the two intake ports 7, i.e., a straight port 7a and a helical port 7b communicate with each of the cylinders 2, however, the purge port 70a may be formed in one of the two intake ports 7. In the first embodiment, the purge port 70a is, formed in the helical port 7b in each cylinder 2. as shown in FIG. 2

The atmospheric air introducing passageway 37, the negative pressure introducing passageway 38 and branch pipes 38a, which are connected to each other via the charcoal canister 34, are combined to form a purge passageway (the charcoal canister 34, the atmospheric air introducing passageway 37, the negative pressure introducing passageway 38 and the branch pipe 38a are hereinafter generically referred to as a purge passageway 49) according to the present invention.

Herein, referring back to FIG. 1, the internal combustion engine 1 incorporates an electronic control unit (ECU) 40 for controlling the engine. Connected via electric wires to this ECU 40 are a variety of sensors such as the SCV position sensor 10b, the vacuum sensor 20, the throttle position sensor 23, the accelerator position sensor 25, the airflow meter 26, the first air/fuel ratio sensor 30 and the second air/fuel ratio sensor 32. In addition to the above, a crank position sensor 13 constructed of a timing rotor 13a fitted to an end portion of the crank shaft 4 and an electromagnetic pick-up 13b attached to the cylinder block 1b in the vicinity of the timing rotor 13a, and a water temperature sensor 14 attached to the cylinder block 1b in order to detect a temperature of the cooling water flowing through the cooling water passageway 1c of the cylinder block 1b.

Moreover, the igniter 6a, the fuel injection valve 9, the actuator 10a, the actuator 22 and the electromagnetic valve 39 are connected via electric wires to the ECU 40.

The ECU 40, with output signals from the variety of sensors serving as parameters, judges an operational state of the internal combustion engine 1, and a vapor fuel adsorptive state in the charcoal canister 34, and, based on results of these judgements, controls the igniter 6a, the fuel injection valve 9, the actuator 10a, the actuator 22 and the electromagnetic valve 39.

Figure 3:
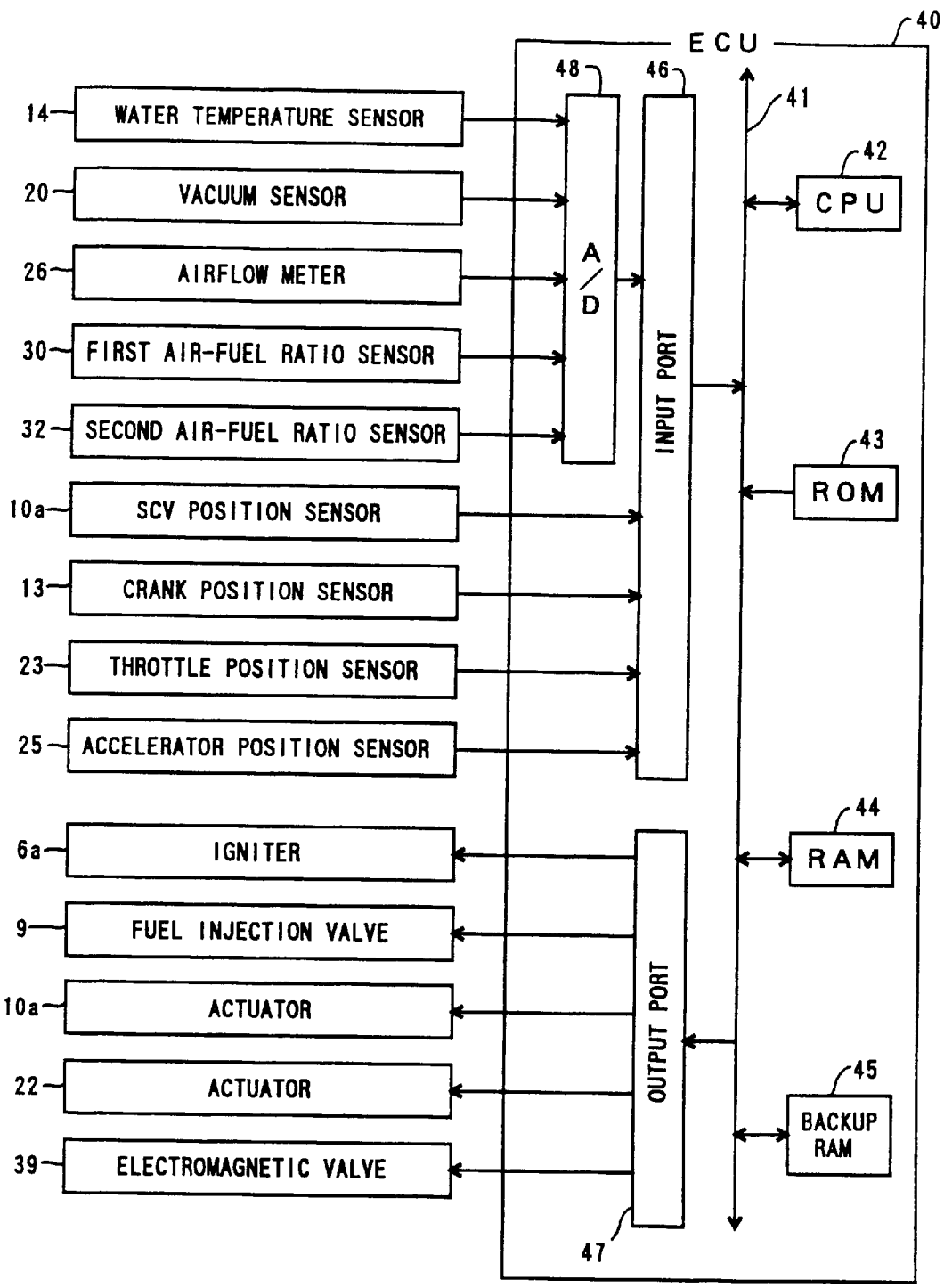
FIG. 3 is a block diagram showing an internal configuration of an ECU.

Herein, the ECU 40, as shown in FIG. 3, includes a CPU 42, a ROM 43, a RAM 44, a backup RAM 45, an input port 46 and an output port 47, which are connected to each other via a bidirectional bus 41. The ECU 40 also includes an A/D converter (A/D) 48 connected to the input port 46.

The input port 46 inputs therein signals outputted from the SCV position sensor 10b, the crank position sensor 13, the throttle position sensor 23 and the accelerator position sensor 25, and transmits these output signals to the CPU 42 or the RAM 44.

Further, the input port 46 inputs therein via the A/D converter 48 signals outputted from the water temperature sensor 14, the vacuum sensor 20, the airflow meter 26 and the first and second air/fuel ratio sensors 30, 32, and transmits these output signals to the CPU 42 or the RAM 44.

The output port 47 outputs a control signal outputted from the CPU 42 to the igniter 6a, the fuel injection valve 9, the actuator 10a, the actuator 22 or the electromagnetic valve 39.

The ROM 43 stores therein a variety of control maps and application programs for a fuel injection quantity control routine for determining a fuel injection quantity, a fuel injection timing control routine for determining a fuel injection timing, an ignition timing control routine for determining an ignition timing, and a purge execution timing control routine for determining a purge execution timing of the vapor fuel.

The control maps may be exemplified by, e.g., a fuel injection quantity control map indicating a relationship between the operational state of the internal combustion engine 1 and the fuel injection quantity, a fuel injection timing control map indicating a relationship between the operational state of the internal combustion engine 1 and the fuel injection timing, an ignition timing control map indicating a relationship between the operational state of the internal combustion engine 1 and the ignition timing, a purge flow rate control map indicating a relationship between the operational state of the internal combustion engine 1 or a state of the charcoal canister 34 and an opening degree of the electromagnetic valve 39, and a purge timing control map indicating a relationship between the operational state of the internal combustion engine 1 and a purge execution timing.

The RAM 44 stores therein the output signals from the various sensors and arithmetic results of the CPU 42. The arithmetic results may be e.g., an engine rotational speed calculated based on the output signal of the crank position sensor 13. Then, the output signals from the variety of sensors and the arithmetic results of the CPU 42 are rewritten into update data each time when the crank position sensor 13 outputs the signal.

The backup RAM 45 is a non-volatile memory for retaining the data even after the internal combustion engine 1 has been stopped.

The CPU 42, which operates based on the application programs stored in the ROM 43, judges an operational state of the internal combustion engine 1 from the output signals of the various sensors, and calculates, from the operational state and from the various control maps, a fuel injection quantity, a fuel injection timing, an opening degree of the throttle valve 21, an ignition timing, an opening/closing timing of the electromagnetic valve 39, an opening degree of the electromagnetic valve 39 (which is a duty ratio: DPG for controlling the electromagnetic valve 39), and a compensation quantity of the fuel injection quantity (a fuel injection compensation quantity) FPG during an execution of the purging. Then, the CPU 42, based on results of the calculations, outputs control signals to the igniter 6a, the fuel injection valve 9, the actuator 10a and the actuator 22 or the electromagnetic valve 39.

For instance, the CPU 42, when judging from an output signal value of the crank position sensor 13 or the accelerator position sensor 25 or the airflow meter 26 that the operational state of the internal combustion engine 1 is in a low-load operation region, decreases an opening degree of the swirl control valve 10 by transmitting the control signal to the actuator 10a in order to provide a stratified charge combustion, and transmits the control signal to the actuator 22, thereby to bring the throttle valve 21 substantially into a full-open state. Further, the CPU 42 applies a drive current to the fuel injection valve 9 at a compression stroke of each cylinder 2, thus executing a compression stroke injection.

In this case, the fresh air is introduced into the combustion chamber 5 of each cylinder 2 mainly via a swirl port 7b during an intake stroke, and a strong swirl flow occurs therein. At the subsequent compression stroke, the fuel injected from the fuel injection valve 9 swirls following the swirl flow in the combustion chamber 5, and moves to the vicinity of the spark plug 6 at a predetermined timing. At this time, in the combustion chamber 5, a combustible air-fuel mixture layer is formed in the vicinity of the spark plug 6, and other areas turn out to be an air layer, thus coming into so-called a stratified state. Then, the CPU 42 actuates the igniter 6a at the above-described predetermined timing, thus igniting the spark plug 6. As a result, the air-fuel mixture (containing the combustible air-fuel mixture layer and the air layer) in the combustion chamber 5 is burned, wherein the combustible air-fuel mixture layer presents in the vicinity of the spark plug 6 serves as an ignition source.

When it is judged that the engine operational state is in an intermediate-load operation region, the CPU 42, in order to attain a uniform lean combustion with a lean air-fuel mixture, transmits the control signal to the actuator 10a to decrease the opening degree of the swirl control valve 10. Further, the CPU 42 applies the drive current to the fuel injection valve 9 at the intake stroke of each cylinder 2, thus performing an intake stroke injection. In this instance, the lean air-fuel mixture in which the fresh air and the fuel are uniformly mixed with each other is formed substantially over the entire area within the combustion chamber 5 of each cylinder 2, whereby the uniform lean combustion is actualized.

When it is judged that the engine operational state is in a high-load operation region, the CPU 42, in order to attain a uniform combustion with the air-fuel mixture having an air/fuel ratio in the vicinity of a theoretical air/fuel ratio, transmits the control signal to the actuator 10a to set the swirl control valve 10 in a full-open state. Then, the CPU 42 transmits the control signal to the actuator 22 so that the throttle valve 21 has an opening degree corresponding to a pedaling quantity (an output signal value of the accelerator position sensor 25) of the accelerator pedal 24, and further applies the drive current to the fuel injection valve 9 at the intake stroke of each cylinder 2, thus performing the intake stroke injection. In this case, the air-fuel mixture having the theoretical air/fuel ratio in which the fresh air and the fuel are uniformly mixed with each other, is formed substantially over the entire area in the combustion chamber 5 of each cylinder 2, whereby the uniform combustion is provided.

Note that when shifting from the stratified charge combustion control to the uniform combustion control and vice versa, the CPU 42 applies the drive current to the fuel injection valve 9 twice separately at the compression stroke and at the intake stroke of each cylinder 2, in order to prevent torque fluctuations of the internal combustion engine 1. In this case, the combustible air-fuel mixture layer is formed in the vicinity of the spark plug 6, and the lean air-fuel mixture layer is formed in other areas, thus so-called a weak stratified charge combustion is provided.

Further, when it is judged that the engine operational state is in an idling operation region, the CPU 42 controls the opening degree of the throttle valve 21 for ensuring an intake air quantity needed for converging an actual engine rotational speed to a target idling engine rotational speed, thus effecting feedback control of so-called idle speed control (ISC).

Next, when executing the purging of the vapor fuel, the CPU 42 normally controls the electromagnetic valve 39 to be closed. In this state, when a pressure in the fuel tank 33 exceeds a first predetermined value with an increase of the vapor fuel in the fuel tank 33, the positive pressure valve of the intra-tank control valve 36 opens, with the result that the vapor fuel passageway 35 is brought into a conductive state. Then, the vapor fuel in the fuel tank 33 is introduced into the charcoal canister 34 via the vapor fuel passageway 35, and temporarily adsorbed by an adsorbent such as activated carbon charged in the charcoal canister 34.

Further, the CPU 42 judges at an interval of a predetermined time whether or not a purge execution condition of the vapor fuel is established. An example of this purge execution condition is, e.g., a condition that the warm-up of the internal combustion engine 1 and of the first and second catalysts 28, 31 is completed, a condition that a quantity of the fuel injected from the fuel injection valve 9 is over a predetermined quantity, or a condition that an elapsed time from the start of the internal combustion engine 1 is over a predetermined time.

When it is judged that the purge execution condition described above is established, the CPU 42 determined which combustion mode the internal combustion engine 1 takes, namely, determines an operational state of the engine as to whether it is in the stratified charge combustion operating state, or the weak stratified charge combustion operating state, or the uniform lean combustion operating state, or the uniform combustion operating state. Based on the thus determined combustion mode, the CPU 42 decides a purge execution timing (a valve open timing of the electromagnetic valve 39 of each cylinder 2) of each cylinder 2.

Specifically, the ROM 43 had previously stored the combustion state control map showing the relationship between an accelerator opening degree, an engine rotational speed and a combustion state, and the CPU 42 has an access to the combustion state control map, based on the accelerator opening degree and the engine rotational speed serving as parameters, and judges which combustion mode the internal combustion engine 1 takes.

When it is judged that the combustion mode of the internal combustion engine 1 is the uniform lean combustion or the uniform combustion, the CPU 42 synchronizes the purge execution timing of each cylinder 2 with the fuel injection timing of each cylinder 2 in order to uniformly mix the purge gas with the fresh air as in the case of the fuel injected from the fuel injection valve 9.

When it is judged that the combustion mode of the internal combustion engine 1 is the stratified charge combustion or the weak stratified charge combustion, the CPU 42 sets the purge execution timing of each cylinder 2 in the intake stroke of each cylinder 2 for making the purge gas partially concentrated in the combustion chamber 5.

Figure 4:
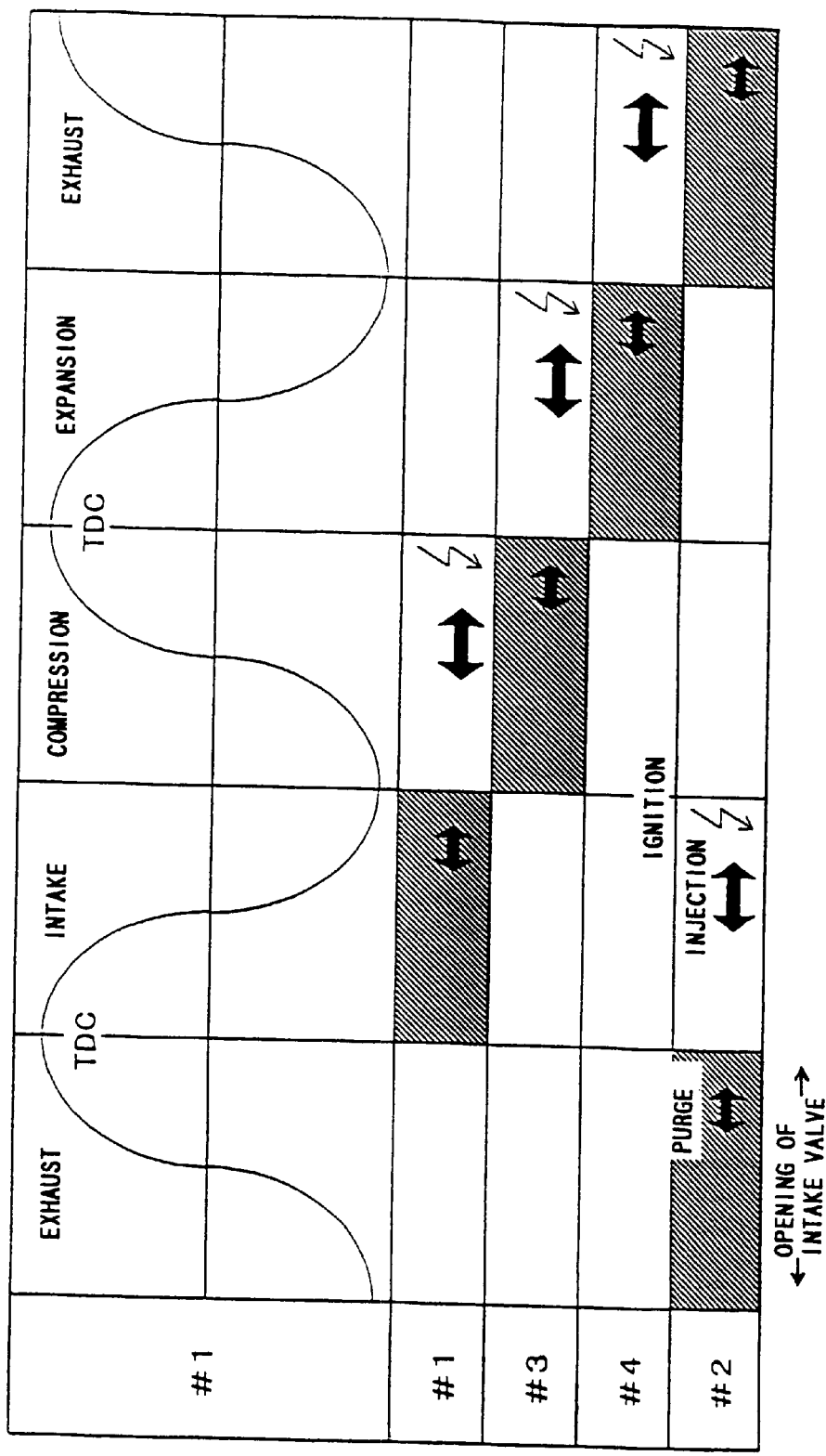
FIG. 4 is a diagram showing a relationship between an operational state of each cylinder and a purge execution timing.

More specifically, at the time of stratified charge combustion operation the CPU 42, as shown in FIG. 4, sets the purge execution timing at the second half of the intake stroke of each cylinder 2, i.e., just before the intake valve 11 closes. This is because the purge gas should be partially concentrated within the combustion chamber 5, by restraining to the greatest possible degree, mixing of the purge gas with the fresh air in the combustion chamber (the purge gas partially concentrated in the combustion chamber 5 is hereinafter referred to as a purge gas layer).

When the internal combustion engine 1 is in the state of the stratified charge combustion operation, the combustion in an oxygen excessive state is caused by the air-fuel mixture formed separately into the combustible air-fuel mixture layer having a predetermined air/fuel ratio and the air layer, in the combustion chamber 5. Therefore, if the purge gas layer described above is partially mixed with the combustible air-fuel mixture layer, a mixture state (a stratified state) is disturbed, and besides the air/fuel ratio of the combustible air-fuel mixture layer becomes excessively rich, with the result that the combustion state of the internal combustion engine 1 becomes unstable.

Such being the case, in accordance with the first embodiment, the CPU 42, on the occasion of setting the purge execution timing at the time of the stratified charge combustion, sets the purge execution timing so that the purge gas layer is mixed within the combustible air-fuel mixture layer. That is, the CPU 42 sets the purge execution timing so that the purge gas layer is provided in the vicinity of the fuel injection valve 9 (within an injection range of the fuel injection valve 9).

More specifically, the purge gas layer partially concentrated in the combustion chamber 5 moves along the swirl flow within the combustion chamber 5, and, therefore, the CPU 42 obtains a time (a reaching-the-injection-range time) required for the purge gas (layer) to move into the injection range of the fuel injection valve 9 from the time of starting the execution of the purging, and subsequently calculates a purge execution end timing by subtracting the reaching-the-injection-range time from the fuel injection timing.

The reaching-the-injection-range time varies according to an intensity of the swirl flow, and the intensity of the swirl flow changes according to the engine rotational speed, the intake air quantity, the opening degree of the throttle valve and the opening degree of the swirl control valve. Thus, the reaching-the-injection-range time can be specified by parameters (such as, e.g., the engine rotational speed, the intake air quantity, the opening degree of the throttle valve and the opening degree of the swirl control valve). In the first embodiment, relationships between the engine rotational speed, the intake air quantity, the opening degree of the throttle valve, the opening degree of the swirl control valve, and the reaching-the-injection-range time, are obtained beforehand through experiments. A map (a reaching-the-injection-range time control map) showing these relationships is stored in a predetermined region of the ROM 43.

Note that the reaching-the-injection-range time set in the reaching-the-injection-range time control map includes a time needed for introducing the purge gas into the combustion chamber 5 from the time when the electromagnetic valve 39 has opened, namely, so-called a purge gas transport delay time.

In this case, the CPU 42, based on the engine rotational speed, the intake air quantity (the output signal value of the airflow meter 26), the opening degree of the throttle valve (the output signal value of the throttle position sensor 23), and the opening degree of the swirl control valve (the output signal value of the SCV position sensor 10b) serving as parameters, accesses the reaching-the-injection-range time control map in the ROM 43, and calculates a reaching-the-injection-range time. Then, the CPU 42 calculates a purge execution end timing by subtracting the reaching-the-injection-range time from the fuel injection timing of each cylinder 2.

On the other hand, based on an adsorbed state of the vapor fuel in the charcoal canister 34 serving as a parameter, the CPU 42 determines a quantity of the purge gas to be purged, and calculates a fuel injection compensation quantity in accordance with the thus determined purge gas quantity and a vapor fuel concentration. Then, the CPU 42 calculates an actual fuel injection quantity by subtracting the fuel injection quantity from a basic fuel injection quantity calculated in a fuel injection quantity control routine.

Further, based on the parameters (such as, for example, the engine rotational speed, the intake air quantity, the opening degree of the throttle valve and the opening degree of the swirl control valve) pertaining to the intake air introduced into the combustion chamber 5, the CPU 42 calculates a time needed for the purging of the purge gas quantity, i.e., an valve opening time of the electromagnetic valve 39.

The CPU 42 calculates a purge execution start timing by subtracting the valve opening time of the electromagnetic valve 39 from the previously calculated purge execution end timing.

As described above, the CPU 42, after calculating the purge execution start timing of each cylinder 2 and the purge execution end timing thereof, compares the output signal value (a rotational position (CA) of the crank shaft 4) of the crank position sensor 13 with the purge execution start timing of each cylinder 2 and the purge execution end timing thereof, each time when the crank position sensor 13 outputs the signal.

When detecting the cylinder 2 of which the purge execution start timing is coincident with the output signal value of the crank position sensor 13, the CPU 42 applies a drive pulse signal corresponding to the duty ratio of 100% to the electromagnetic valve 39 of the branch pipe 38a connected to this cylinder 2. The electromagnetic valve 39 is thereby fully opened, and the purging with respect to the above cylinder 2 is started.

It is to be noted that the opening degree of the electromagnetic valve 39 at the time of the purge execution is not limited to the full-open state, but may be properly changed according to the engine operational state (such as the combustion state, the fuel injection quantity, the load and the vapor fuel concentration and the like).

Further, when detecting the cylinder 2 of which the purge execution end timing is coincident with the output signal value of the crank position sensor 13, the CPU 42 applies a drive pulse signal corresponding to the duty ratio of 0% to the electromagnetic valve 39 of the branch pipe 38a connected to this cylinder 2. The electromagnetic valve 39 is thereby fully closed, and the purging with respect to the above cylinder 2 is ended.

When the electromagnetic valve 39 of the branch pipe 38a connected to a certain cylinder 2 is opened, the purge passageway 49 constructed of the branch pipe 38a, the negative pressure introducing passageway 38, the charcoal canister 34 and the atmospheric air introducing passageway 37, is brought into a conductive state. At this time, a pressure in the intake pipe 18 disposed upstream of the throttle valve 21 which is located upstream of the purge passageway 49, comes to approximately the atmospheric pressure PA, and a pressure PM in the intake port 7a disposed downstream of the purge passageway 49 becomes negative due to a generation of the negative pressure in the intake pipe, and hence there occurs a differential pressure ΔPM (=PA−PM) between the upstream side and the downstream side of the purge passageway 49.

With the differential pressure ΔPM given above, a portion of the atmospheric air flowing through the intake pipe 18 disposed upstream of the throttle valve 21 flows into the purge passageway 49 and is led to the helical port 7b via this purge passageway 49. Namely, in the purge passageway 49, there is formed a flow of the atmospheric air flowing through the charcoal canister 34.

On that occasion, the vapor fuel adsorbed to the adsorbent in the charcoal canister 34 receives the flow of the atmospheric air therethrough, and desorbs from the adsorbent, and is led together with the atmospheric air into the helical port 7b.

Figure 5:
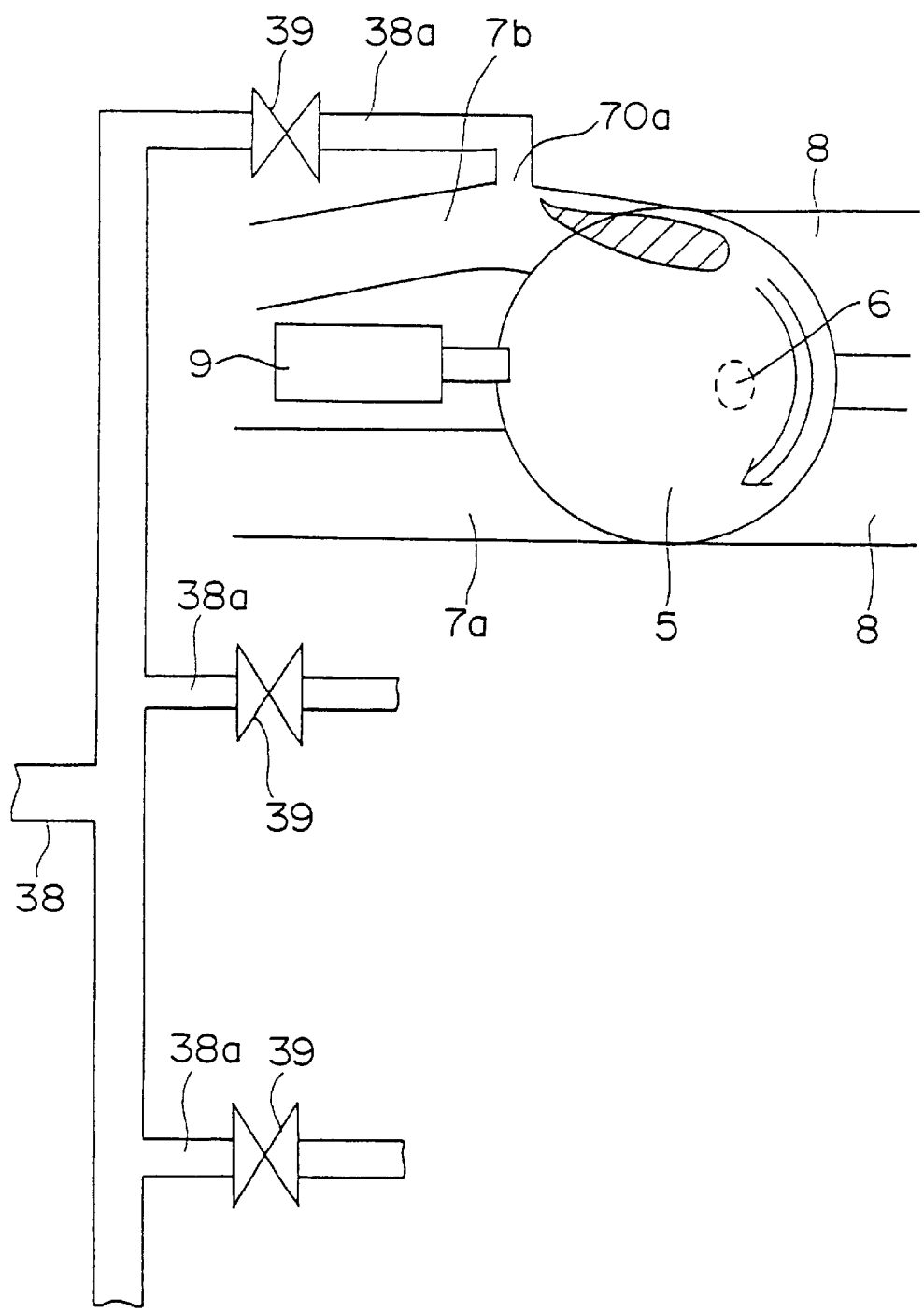
FIG. 5 is an explanatory diagram showing a purge control procedure (1)

The atmospheric air and the vapor fuel (purge gas), which have thus been introduced into the helical port 7b, flow into the combustion chamber 5 together with the fresh air flowing from upstream of the helical port 7b. On this occasion, the opening degree of the swirl control valve 10 is small, and, therefore, a large portion of the fresh air sucked into the combustion chamber 5 flows in via the helical port 7b, whereby an intensive swirl flow is produced. Further, a distance between the purge port 70a and the combustion chamber 5 is short, so that the purge gas introduced into the helical port 7b from the purge port 70 flows along the swirl flow without being mixed with the fresh air, thereby forming a purge gas layer (a partially-concentrated gas) presents in concentration somewhere in the combustion chamber 5 (see FIG. 5). Thus, the helical port 7b and the swirl control valve 10 provide swirl flow generating means according to the present invention, while the purge port 70 disposed at the helical port 7b provides partially-concentrated gas forming means.

Figure 6:
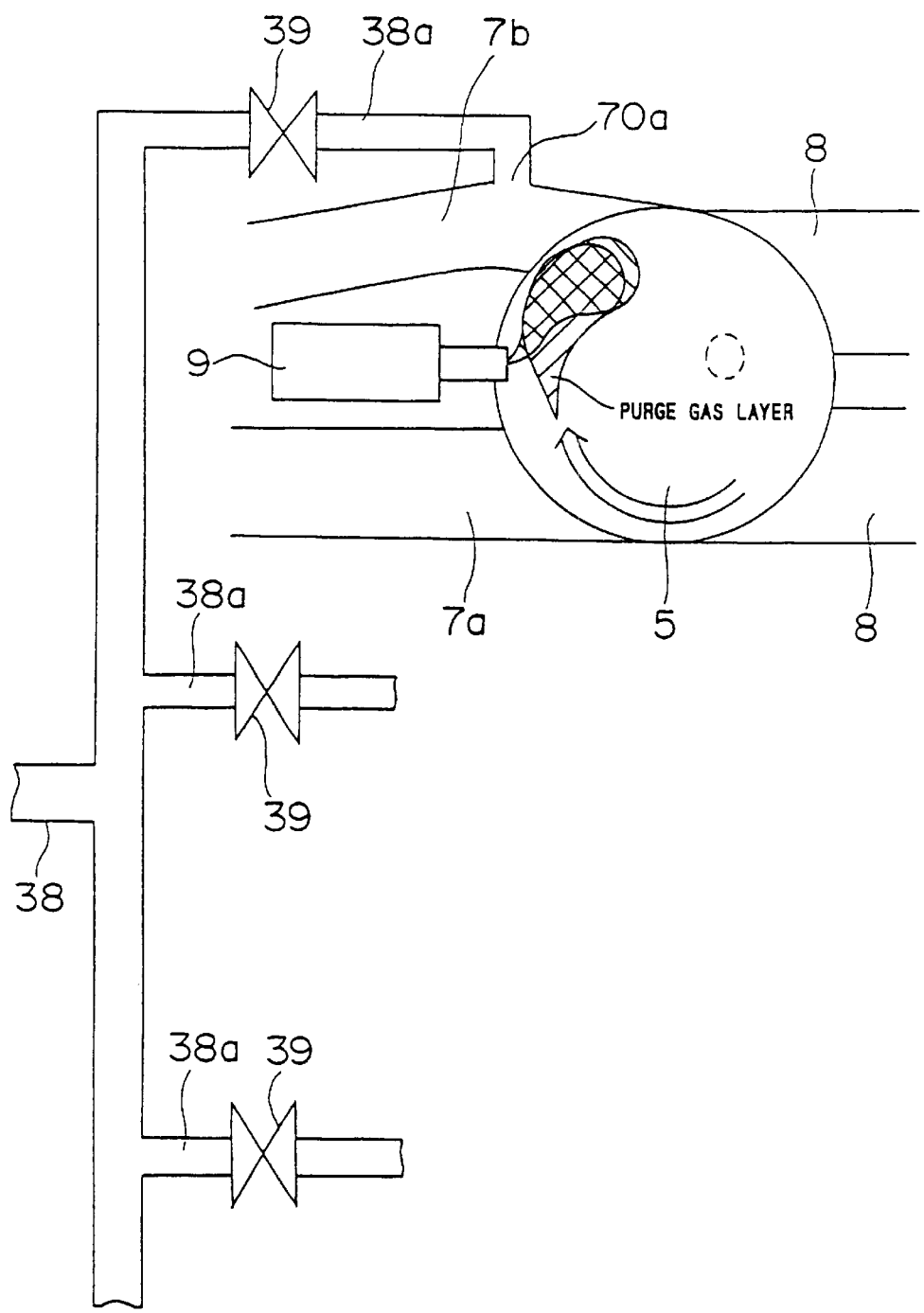
FIG. 6 is an explanatory diagram showing a purge control procedure (2)

Subsequently, the purge gas layer described above swirls around along the swirl flow within the combustion chamber 5, and moves into the injection range of the fuel injection valve 9. Then, at a point of time when the purge gas layer moves into the injection range, the fuel is injected from the fuel injection valve 9, and, the fuel injected from the fuel injection valve 9 is mixed with the purge gas layer, thereby forming the combustible air-fuel mixture layer (see FIG. 6). At this time, a quantity of the fuel injected from the fuel injection valve 9 is set as being compensated with a reduced quantity in anticipation of a quantity of the vapor fuel contained in the purge gas, and hence the air/fuel ratio of the combustible air-fuel mixture layer becomes a desired air/fuel ratio.

Figure 7:
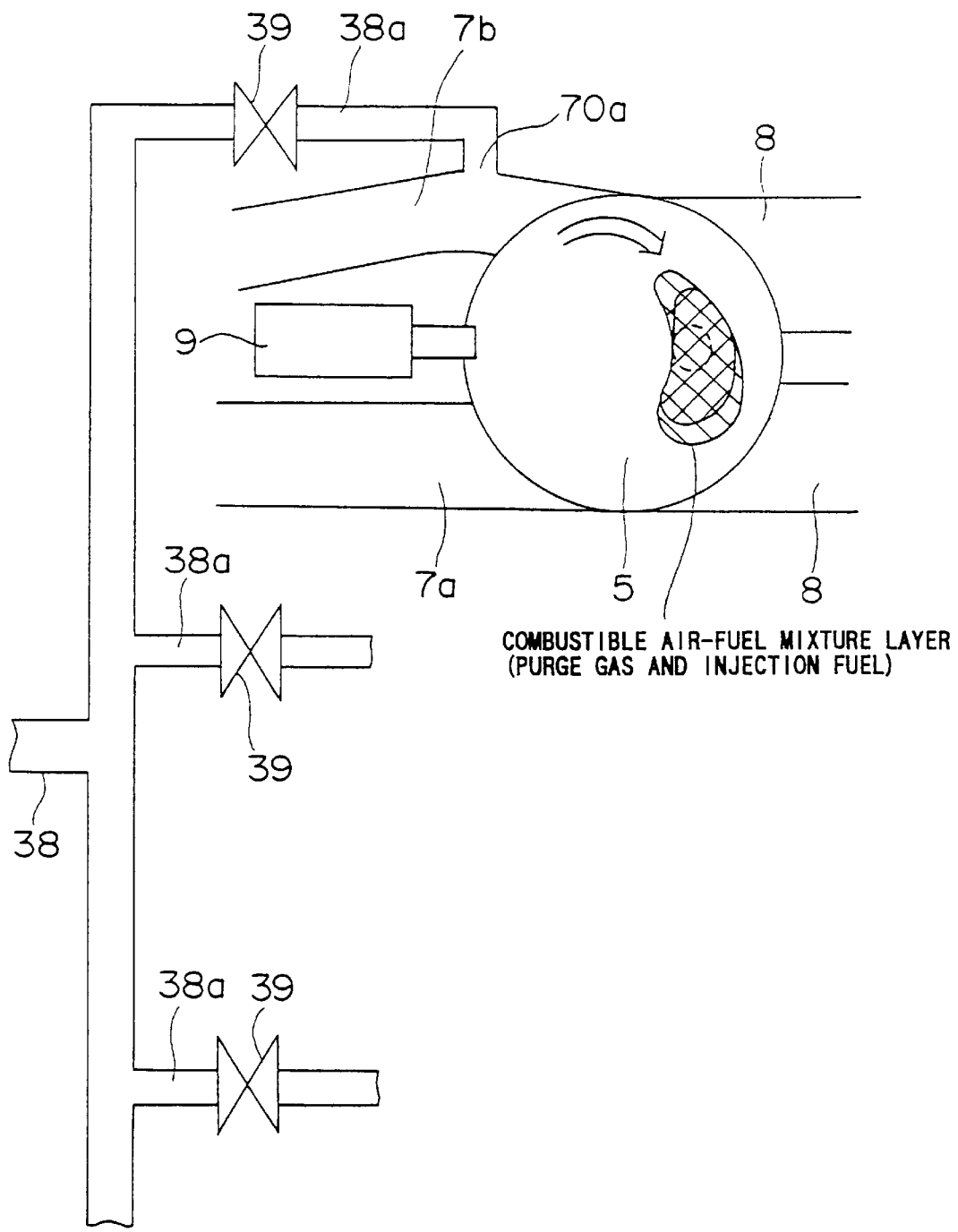
FIG. 7 is an explanatory diagram showing a purge control procedure (3)

The thus formed combustible air-fuel mixture layer moves along the swirl flow to the vicinity of the spark plug 6, and, upon subsequent ignition of the spark plug, it is burned (see FIG. 7).

Under the control described above, the purging of the vapor fuel can be carried out without disturbing the stratified state of the air-fuel mixture even when the internal combustion engine 1 is in the stratified charge combustion operating state.

Note that if the fuel concentration in the purge gas is excessively high (if the vapor fuel quantity in the purge gas is excessively large), the combustible air-fuel mixture layer composed of the purge gas layer and the injection fuel becomes an over-fuel state, and it can be presumed that the combustion state of the internal combustion engine 1 might be destabilized. Hence, it is preferable that the execution of the purging be inhibited at the time of the stratified charge combustion operation.

The purge control will hereinafter be described more specifically.

Figure 8:
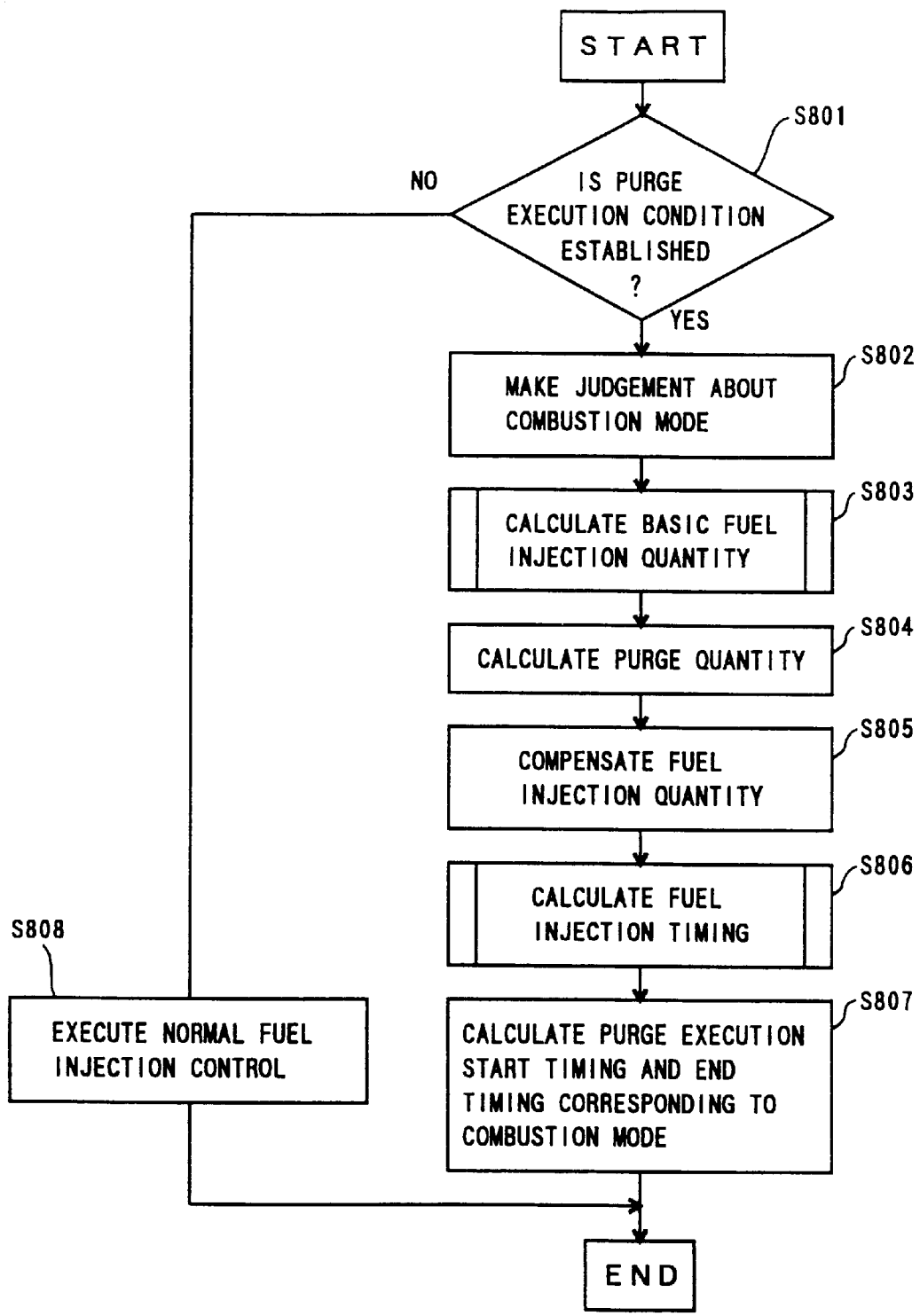
FIG. 8 is a flowchart showing a purge execution timing control routine.

The CPU 42 executes a purge execution timing control routine as shown in FIG. 8 at an interval of a predetermined time.

In the purge execution timing control routine, the CPU 42 judges in S801 whether or not a purge execution condition is established.

When it is judged in S801 that the purge execution condition is not established, the CPU 42 advances to S808 wherein the CPU 42 executes the normal fuel injection control.

When it is judged in S801 that the purge execution condition is established, the CPU 42 advances to S802 wherein the CPU 42 reads the engine rotational speed and the accelerator opening degree (the output signal value of the accelerator position sensor 25) from the RAM 44, and, based on the engine rotational speed and the accelerator opening degree, determines the combustion mode taken by the internal combustion engine.

In S803, the CPU 42 calculates a basic fuel injection quantity by executing a separately programmed fuel injection quantity control routine. On this occasion, the CPU 42 calculates the basic fuel injection quantity on the basis of the fuel injection quantity control map corresponding to the combustion mode determined in S802.

In S804, the CPU 42 calculates a quantity of the purge gas to be purged (per cylinder) on the basis of the adsorbed state of the vapor fuel in the charcoal canister 34. Note that the adsorbed state of the vapor fuel can be estimated, based on a pressure and a temperature in the fuel tank 33, a purge execution time, and a purge stopping time or a temperature of the charcoal canister 34 serve as parameters.

In S805, the CPU 42 calculates a quantity of the vapor fuel to be actually purged from the purge gas quantity calculated in S804 and the fuel concentration in the purge gas. The CPU 42 determines a fuel injection compensation quantity based on the vapor fuel quantity, and calculates an actual fuel injection quantity by subtracting the fuel injection compensation quantity from the basic fuel injection quantity which was calculated in S803.

In S806, the CPU 42 calculates a fuel injection timing by executing a separately programmed fuel injection timing control routine. At this time, the CPU 42 calculates the fuel injection timing of each cylinder 2 on the basis of the fuel injection timing control map according to the combustion mode determined in S802 and the fuel injection quantity calculated in S805.

In S807, the CPU 42 calculates the purge execution start timing and the purge execution end timing in accordance with the combustion mode judged in S802. On this occasion, if the combustion mode of the internal combustion engine 1 is the stratified charge combustion or the weak stratified charge combustion, the CPU 42 reads from the RAM 44 the engine rotational speed, the intake air quantity (the output signal value of the airflow meter 26), the opening degree of the throttle valve (the output signal value of the throttle position sensor 23), and the opening degree of the swirl control valve (the output signal value of the SCV position sensor 10b).

Then, the CPU 42, based on the engine rotational speed, the intake air quantity, the opening degree of the throttle valve, and the opening degree of the swirl control valve serving as parameters, accesses the reaching-the-injection-range time control map in the ROM 43, and calculates a reaching-the-injection-range time.

Subsequently, the CPU 42 calculates the purge execution end timing of each cylinder 2 by subtracting the reaching-the-injection-range time from the fuel injection timing calculated in S806. Then, the CPU 42 calculates a time (a valve opening time of the electromagnetic valve 39) necessary for introducing the purge gas quantity per cylinder calculated in S804 into the helical port 7b from the purge passageway 49, and also calculates the purge execution start timing by subtracting the valve opening time of the electromagnetic valve 39 from the purge execution end timing. The CPU 42 stores the purge execution start timing and the purge execution end timing of each cylinder 2, in the predetermined areas of the RAM 44, and finishes executing this routine.

Figure 9:
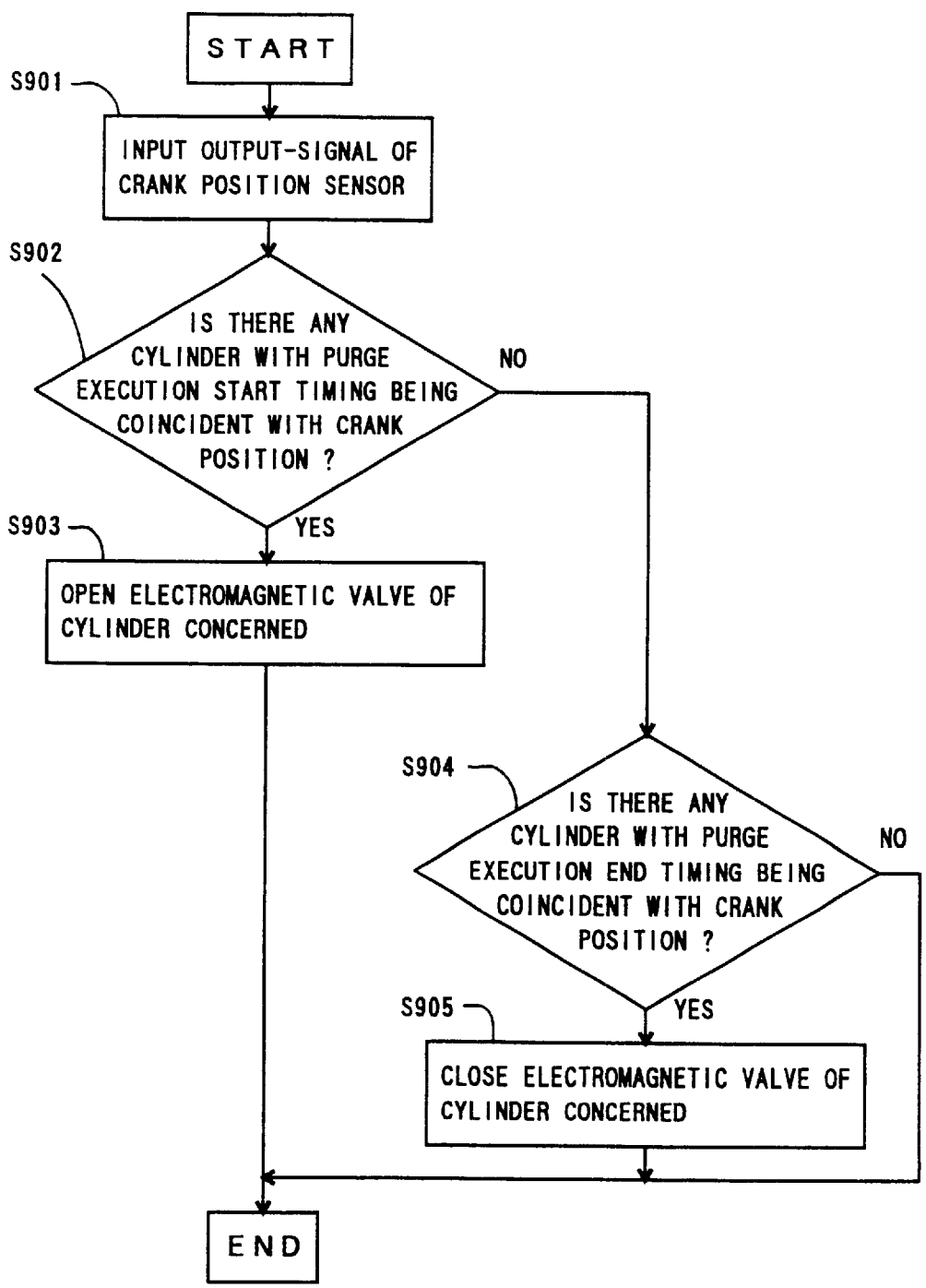
FIG. 9 is a flowchart showing a purge execution control routine.

On the other hand, the CPU 42 executes a purge execution control routine as shown in FIG. 9 each time when the crank position sensor 13 outputs the signal.

In the purge execution control routine, the CPU 42 inputs therein from the RAM 44 the output signal value (a rotational position of the crank shaft 4) of the crank position sensor 13.

In S902, the CPU 42 accesses to the predetermined area, and judges whether or not there is the cylinder 2 in which the rotational position of the crank shaft 4 which has been inputted in S901 is coincident with the purge execution start timing.

When it is judged in S902 that there is the cylinder 2 in which the rotational position of the crank shaft 4 is coincident with the purge execution start timing, the CPU 42 moves to S903 wherein the CPU 42 starts purging the vapor fuel by applying the drive pulse signal corresponding to the duty ratio of 100% to the electromagnetic valve 39 of the branch pipe 38a connected to that cylinder 2.

Whereas if it is judged in S902 that there is no cylinder 2 in which the rotational position of the crank shaft 4 is coincident with the purge execution start timing, the CPU 42 advances to S904 wherein the CPU 42 judges whether or not there is the cylinder 2 in which the rotational position of the crank shaft 4 is coincident with the purge execution end timing.

When it is judged in S904 that there is the cylinder 2 in which the rotational position of the crank shaft 4 is coincident with the purge execution end timing, the CPU 42 moves to S905 wherein the CPU 42 finishes purging the vapor fuel by applying the drive pulse signal corresponding to the duty ratio of 0% to the electromagnetic valve 39 of the branch pipe 38a connected to that cylinder 2.

Whereas if it is judged in S904 that there is no cylinder 2 in which the rotational position of the crank shaft 4 is coincident with the purge execution end timing, the CPU 42 finishes executing this routine.

According to the first embodiment discussed above, the vapor fuel can be purged without disturbing the stratified state of the air-fuel mixture even when the internal combustion engine 1 is not only in the uniform combustion operating state, but also in the stratified charge combustion operating state, and it is, therefore, feasible to process the vapor fuel adsorbed in the charcoal canister 34 irrespective of the combustion mode of the internal combustion engine 1. Furthermore, the fuel injection quantity can be reduced by purging the vapor fuel during the operation of the stratified charge combustion, and hence a fuel consumption rate can be improved.

<Embodiment 2>

A second embodiment of the vapor fuel processing apparatus according to the present invention will be described with reference to the drawings. Herein, a configuration which is different from the above-described first embodiment will be described, and descriptions of the same configurations are omitted.

The second embodiment will be described by way of an example in which how to change a purge control method at the time of the operation of the stratified charge combustion in the engine in accordance with a concentration of the vapor fuel contained in the purge gas.

Under the fuel injection control during the purge execution, the fuel injection quantity is compensated for a reduced quantity, anticipating the quantity of the vapor fuel to be purged. However, a minimum fuel injection quantity is set in the normal fuel injection valve, and, therefore, the fuel concentration in the purge gas becomes a predetermined concentration or higher (which means that the quantity of the vapor fuel contained in the purge gas is over a predetermined quantity), and, when the fuel injection quantity compensated for the reduced quantity is under the minimum fuel injection quantity, there must be executed so-called a lower limit guard process is executed in which the minimum fuel injection quantity is regarded as an actual fuel injection quantity.

In such a case, if the combustible air-fuel mixture layer is formed by mixing the purge gas layer with the injection fuel, it follows that an excessive fuel is contained in the combustible mixture layer, which might lead to such a possibility that an ignition property declines, or a rich accidental fire is induced.

Such being the case, in accordance with the second embodiment, the purging of the vapor fuel at the time of the operation of the stratified charge combustion is carried out in one of the following modes. If the vapor fuel concentration in the purge gas is less than a first predetermined concentration, the combustible air-fuel mixture layer is formed by mixing the purge gas layer with the fuel injected from the fuel injection valve 9, as in the first embodiment. If the vapor fuel concentration in the purge gas is over the first predetermined concentration but less than a second predetermined concentration, the combustible mixture layer composed of only the injection fuel is formed without mixing the purge gas layer with the fuel injected from the fuel injection valve 9. Further, if the vapor fuel concentration in the purge gas is over the second predetermined concentration, the combustion mode of the internal combustion engine 1 is changed from the stratified charge combustion to the uniform combustion.

To be more specific, when it is judged that the vapor fuel concentration in the purge gas is over the first predetermined concentration but less than the second predetermined concentration, the CPU 42 sets the purge execution timing so that the purge gas layer presents out of the injection range of the fuel injection valve 9 at the time of injecting the fuel.

Namely, the CPU 42 calculates a time (a reaching-off-the-injection-range time) required for the purge gas (layer) introduced into the combustion chamber 5 from the helical port 7b not reaching or out of the injection range of the fuel injection valve 9, and calculates a purge execution end timing by subtracting the reaching-off-the-injection-range time from the fuel injection timing.

A method of setting the reaching-off-the-injection-range time may be exemplified as follows. Sets the time within such a range that the purge gas layer does not reach the injection range of the fuel injection valve 9, or sets the time within a range after the purge gas layer has passed through the injection range of the fuel injection valve 9. In the second embodiment, the description is made by exemplifying the method of setting the reaching-off-the-injection-range time of before reaching the injection range, namely, in a range that the purge gas layer does not reach the injection range of the fuel injection valve 9.

In this case, the CPU 42, to begin with, calculates the reaching-the-injection-range time in the procedure stated in the above-described first embodiment. Subsequently, the CPU 42 sets a time obtained by subtracting the fuel injection time from the reaching-the-injection-range time, which serves as the reaching-off-the-injection-range time (pre-reaching-the-injection-range time).

Next, the CPU 42 calculates a purge execution end timing by subtracting the pre-reaching-the-injection-range time from the fuel injection timing. Subsequently, based on the parameters (such as, e.g., the engine rotational speed, the intake air quantity, the opening degree of the throttle valve and the opening degree of the swirl control valve) pertaining to the intake air introduced into the combustion chamber 5, the CPU 42 calculates a time needed for the purging of the purge gas quantity (an valve opening time of the electromagnetic valve 39), and further calculates a purge execution start timing by subtracting the valve opening time of the electromagnetic valve 39 from the previously calculated purge execution end timing.

After calculating the purge execution start timing of each cylinder 2 and the purge execution end timing thereof, as explained above, the CPU 42 compares the output signal value (a rotational position (CA) of the crank shaft 4) of the crank position sensor 13 with the purge execution start timing of each cylinder 2 and the purge execution end timing thereof each time when the crank position sensor 13 outputs the signal.

When detecting the cylinder 2 of which the purge execution start timing is coincident with the output signal value of the crank position sensor 13, the CPU 42 applies the drive pulse signal corresponding to the duty ratio of 100% to the electromagnetic valve 39 of the branch pipe 38a connected to this cylinder 2.

Further, when detecting the cylinder 2 of which the purge execution end timing is coincident with the output signal value of the crank position sensor 13, the CPU applies the drive pulse signal corresponding to the duty ratio of 0% to the electromagnetic valve 39 of the branch pipe 38a connected to this cylinder 2.

When the electromagnetic valve 39 of the branch pipe 38a connected to a certain cylinder 2 is opened, there occurs a flow of the atmospheric air flowing through the charcoal canister 34 due to a differential pressure ΔPM between the upstream side and the downstream side of the purge passageway 49, and the vapor fuel adsorbed to the adsorbent in the charcoal canister 34 desorbs from the adsorbent and is led into the helical port 7b.

Figure 10:
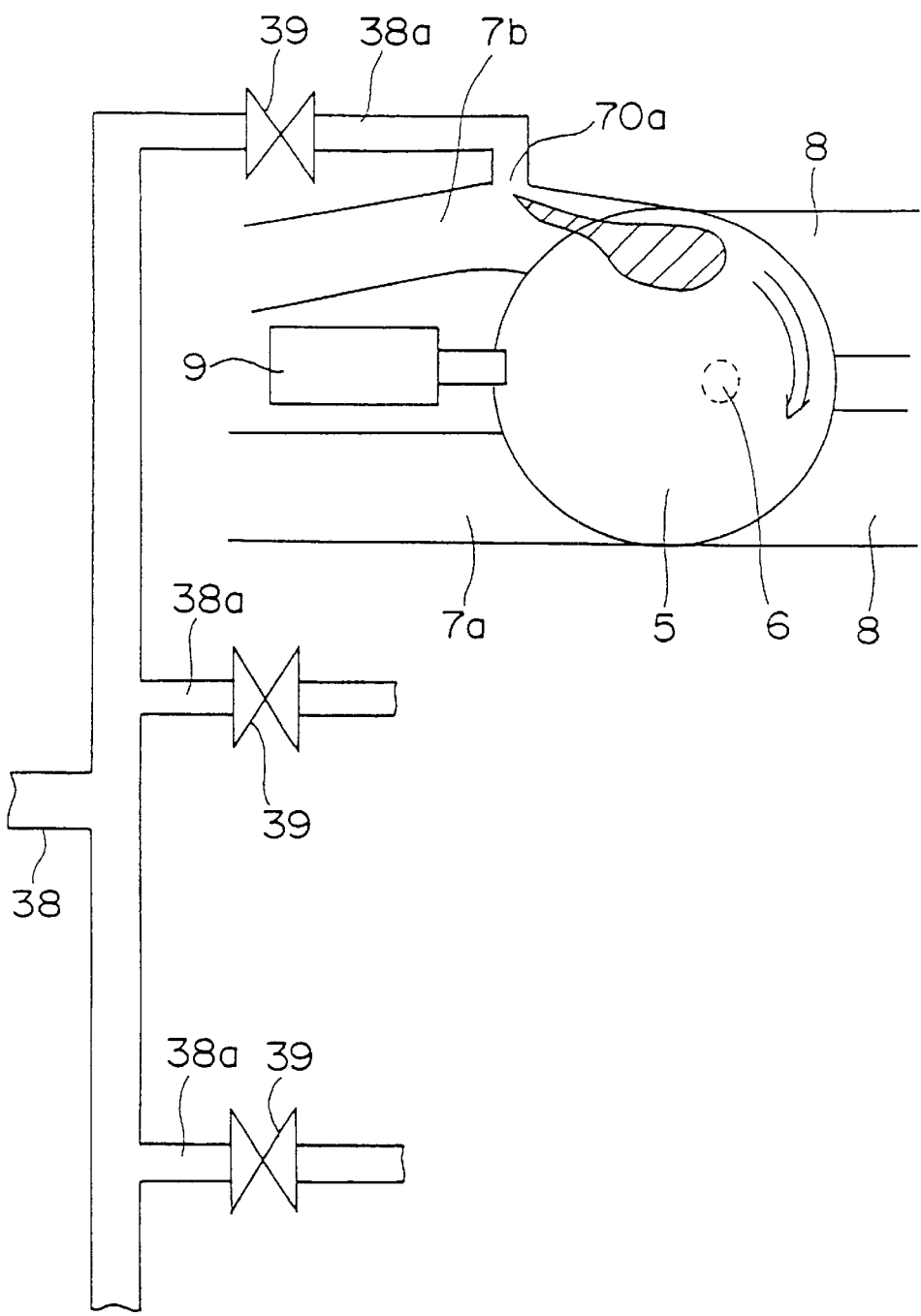
FIG. 10 is an explanatory diagram showing a purge control procedure (4)

Thus, the atmospheric air and the vapor fuel (purge gas), which have thus been introduced into the helical port 7b, flow into the combustion chamber 5 together with the fresh air flowing from upstream of the helical port 7b. On this occasion, the opening degree of the swirl control valve 10 is small, and, therefore, a large portion of the fresh air sucked into the combustion chamber 5 flows in via the helical port 7b, whereby an intensive swirl flow is generated. Further, a distance between the purge port 70a and the combustion chamber 5 is short, so that the purge gas introduced into the helical port 7b from the purge port 70 flows along the swirl flow without being mixed with the fresh air, thereby forming a purge gas layer (a partially-concentrated gas) in concentration presents somewhere in the combustion chamber 5 (see FIG. 10).

Figure 11:
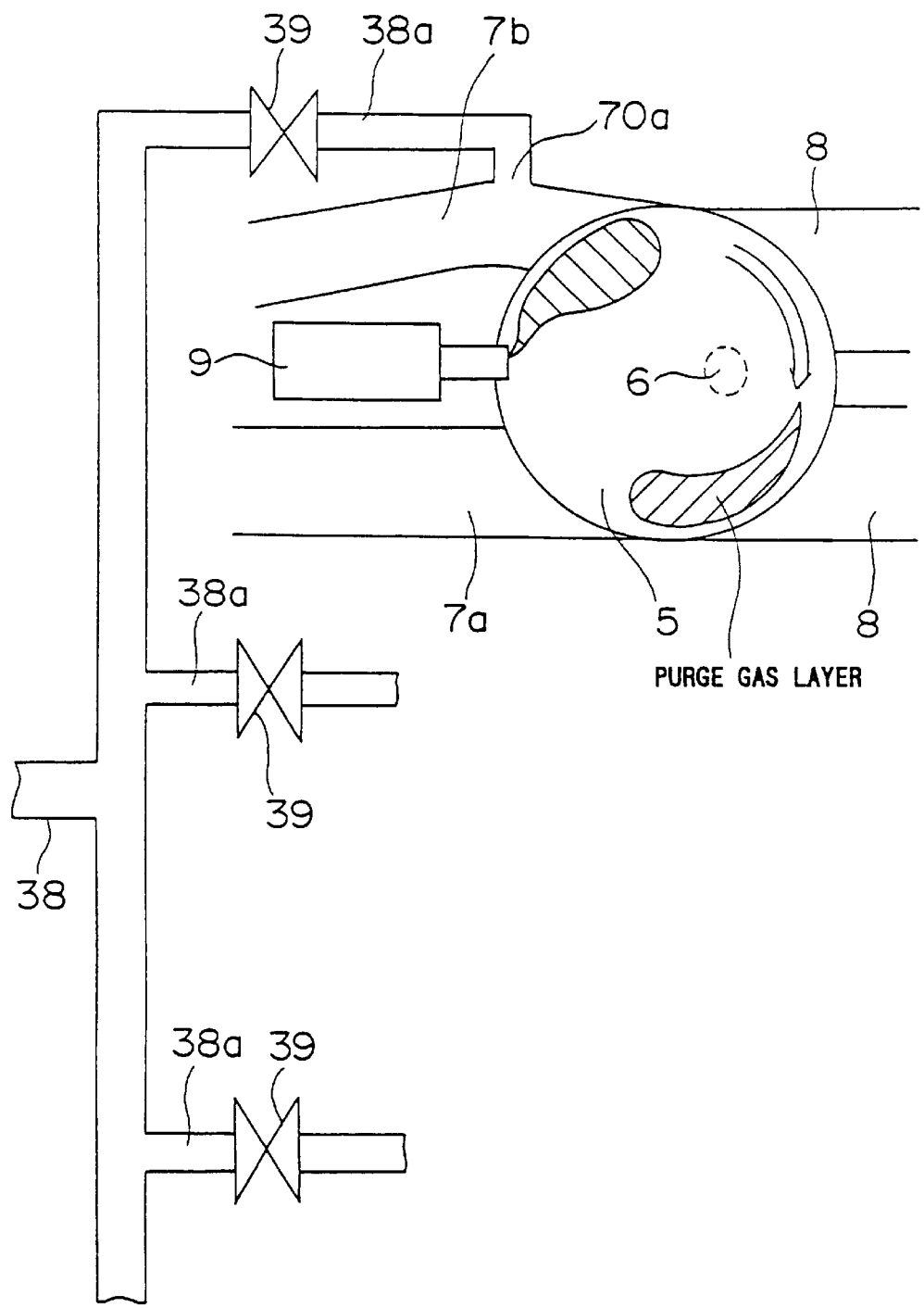
FIG. 11 is an explanatory diagram showing a purge control procedure (5)

Subsequently, the purge gas layer described above swirls around along the swirl flow in the combustion chamber 5, but does not reach the injection range of the fuel injection valve 9 till the fuel injection from the fuel injection valve 9 comes to an end (see FIG. 11).

Figure 12:
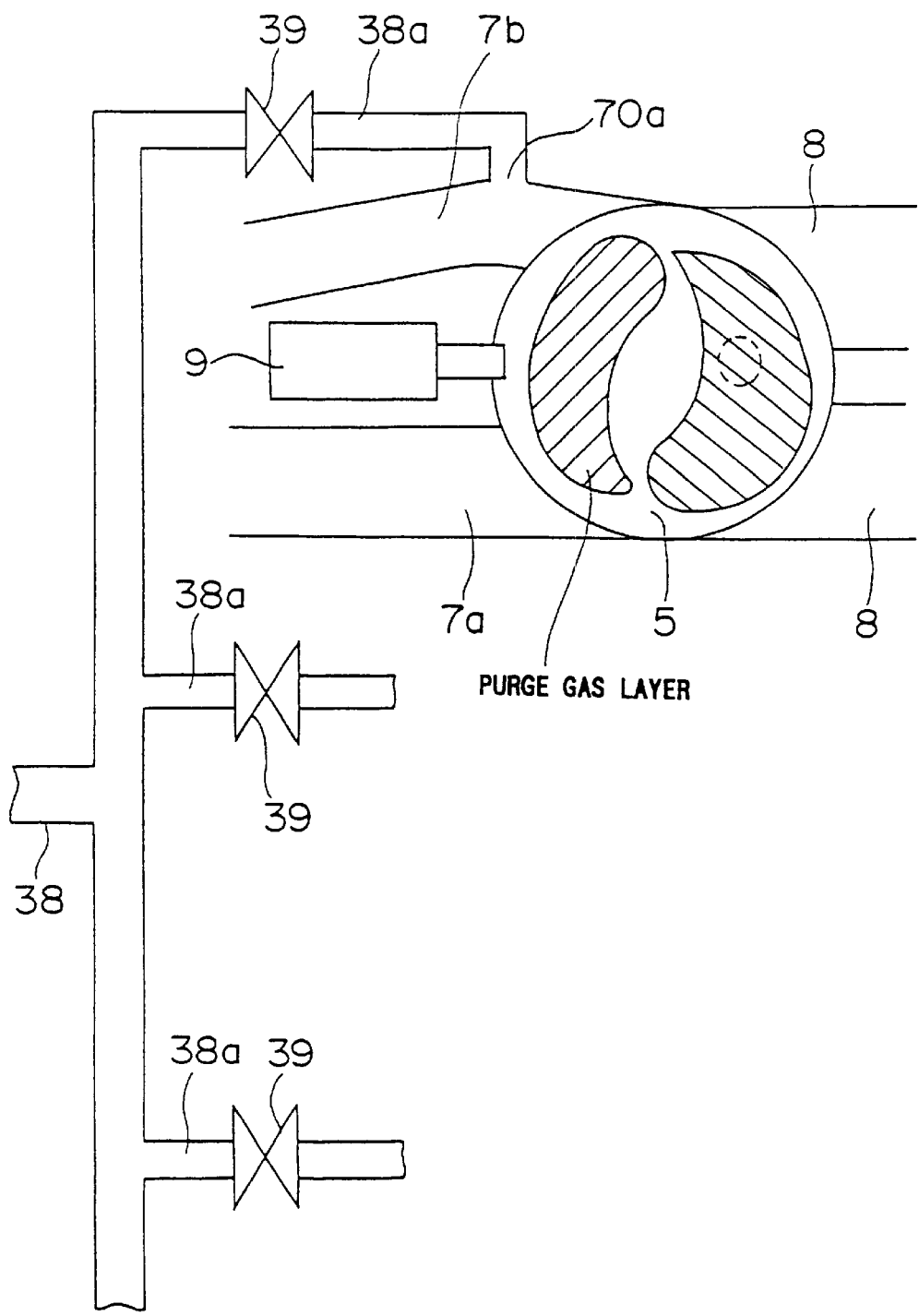
FIG. 12 is an explanatory diagram showing a purge control procedure (6)

Then, the fuel injected from the fuel injection valve 9 presents in concentration in a position independent of the purge gas layer, thus forming the combustible air-fuel mixture layer. Thereafter, the purge gas layer and the combustible air-fuel mixture layer swirl around in the combustion chamber 5 without being mixed with each other. Then, the ignition of the spark plug takes place just when the combustible air-fuel mixture layer moves to the vicinity of the spark plug 6, and the combustible air-fuel mixture layer is burned as an ignition source, thus provides the so-called weak stratified charge combustion (see FIG. 12).

Under the above-described control, the vapor fuel can be purged without disturbing the stratified state of the air-fuel mixture during the stratified charge combustion.

The specific purge control in the second embodiment will hereinafter be described.

Figure 13:
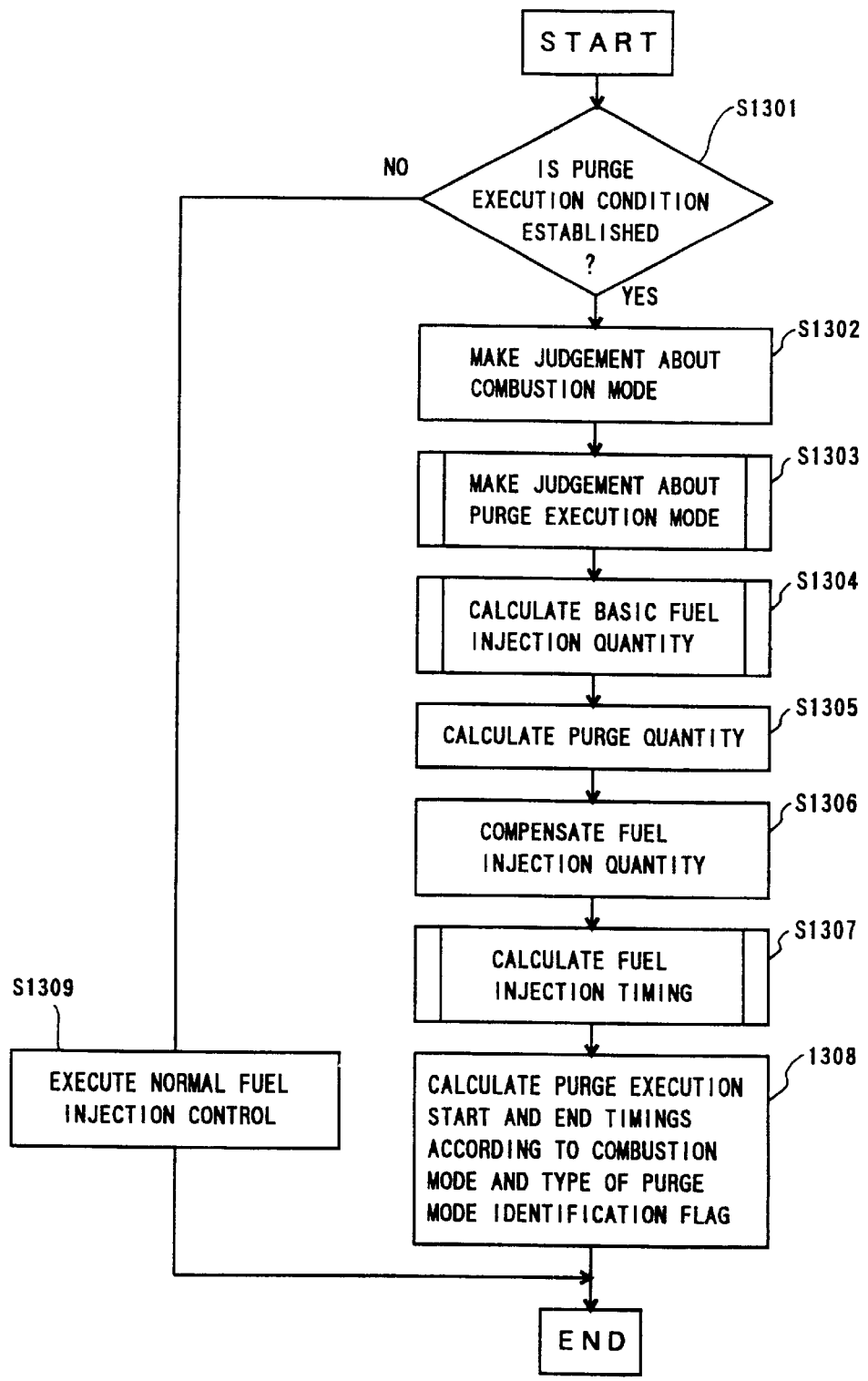
FIG. 13 is a flowchart showing a purge execution timing control routine in a second embodiment.

The CPU 42 executes a purge execution timing control routine as shown in FIG. 13 at an interval of a predetermined time.

In the purge execution timing control routine, the CPU 42 judges in S1301 whether or not a purge execution condition is established.

When it is judged in S1301 that the purge execution condition is not established, the CPU 42 advances diverts to S1309 wherein the CPU 42 executes the normal fuel injection control.

When it is judged in S1301 that the purge execution condition is established, the CPU 42 advances to S1302 wherein the CPU 42 reads the engine rotational speed and the accelerator opening degree (the output signal value of the accelerator position sensor 25) from the RAM 44, and, based on the engine rotational speed and the accelerator opening degree, determines the combustion mode taken by the internal combustion engine.

In S1303, the CPU 42 determines a purge execution mode. This process is accomplished by the CPU 42 implementing a purge execution mode judging routine shown in FIG. 14.

In the purge execution mode judging routine, the CPU 42 judges in S1401 whether or not the combustion mode determined in S1302 is the stratified charge combustion.

When it is judged in S1401 that the combustion mode of the internal combustion engine 1 is not the operation of the stratified charge combustion, the CPU 42 finishes the execution of this routine.

On the other hand, when it is judged in S1401 that the combustion mode of the internal combustion engine 1 is the operation of the stratified charge combustion, the CPU 42 advances to S1402 wherein the CPU 42 calculates a vapor fuel concentration in the purge gas based on an output signal value of an HC sensor and the like.

In S1403, the CPU 42 judges whether or not the vapor fuel concentration calculated in S1402 is over a first predetermined concentration.

When it is judged in S1403 that the vapor fuel concentration is less than the first predetermined concentration, the CPU 42 moves to S1404 in which the CPU 42 writes "1" to a purge mode identification flag storage area set in the RAM 44, and finishes the execution of this routine.

Setting of the purge mode identification flag is made as follows. When the purging at the time of the stratified charge combustion is executable and also the purge gas layer can be mixed with the injection fuel, "1" is set in the purge mode identification flag. When the purging at the time of the stratified charge combustion is executable, but the purge gas layer can not be mixed with the injection fuel, "2" is set in the purge mode identification flag. When the purging at the time of the stratified charge combustion is not executable, "3" is set in the purge mode identification flag.

Further, when it is judged in S1403 that the vapor fuel concentration is over the first predetermined concentration, the CPU advances to S1405 wherein the CPU 42 judges whether the vapor fuel concentration is less than a second predetermined concentration.

When it is judged in S1405 that the vapor fuel concentration is less than the second predetermined concentration, i.e., that the vapor fuel concentration is over the first predetermined concentration but less than the second predetermined concentration, the CPU 42 advances to S1406 wherein the CPU 42 writes "2" to the purge mode identification flag storage area in the RAM 44, and finishes the execution of this routine.

Further, when it is judged in S1405 that the vapor fuel concentration is over the second predetermined concentration, the CPU determines that the purging in the stratified charge combustion is not executable, and moves to S1407.

In S1407, the CPU 42 writes "3" to the purge mode identification flag storage area in the RAM 44, and finishes the execution of this routine.

The CPU 42, having finished the execution of the purge execution mode judging routine, returns to the purge execution timing control routine, and calculates in S1304 a basic fuel injection quantity by executing a separately programmed fuel injection quantity control routine. On this occasion, the CPU 42 calculates the basic fuel injection quantity on the basis of the fuel injection quantity control map corresponding to the combustion mode judged in S1302.

In S1305, the CPU 42 calculates a quantity of the purge gas to be purged (per cylinder) on the basis of the adsorbed state of the vapor fuel in the charcoal canister 34.

In S1306, the CPU 42 calculates a quantity of the vapor fuel to be actually purged from the purge gas quantity calculated in S1305 and from the fuel concentration in the purge gas. The CPU 42 determines a fuel injection compensation quantity based on the vapor fuel quantity, and calculates an actual fuel injection quantity by subtracting the fuel injection compensation quantity from the basic fuel injection quantity calculated in S1304.

In S1307, the CPU 42 calculates a fuel injection timing by executing a separately programmed fuel injection timing control routine. On this occasion, the CPU 42 calculates the fuel injection timing of each cylinder 2 on the basis of the fuel injection timing control map corresponding to the combustion mode judged in S1302 and the fuel injection quantity calculated in S1306.

In S1308, the CPU 42 calculates the purge execution start timing and the purge execution end timing in accordance with the combustion mode judged in S1302 and the purge mode identification flag set in S1303.

On this occasion, if the combustion mode of the internal combustion engine 1 is the stratified charge combustion or the weak stratified charge combustion, and if "1" is set in the purge mode identification flag, the CPU 42 reads from the RAM 44 the engine rotational speed, the intake air quantity (the output signal value of the airflow meter 26), the opening degree of the throttle valve (the output signal value of the throttle position sensor 23), and the opening degree of the swirl control valve (the output signal value of the SCV position sensor 10*b*). Then, the CPU 42, based on the engine rotational speed, the intake air quantity, the opening degree of the throttle valve, and the opening degree of the swirl control valve serving as parameters, accesses the reaching-the-injection-range time control map in the ROM 43, and calculates a reaching-the-injection-range time.

Subsequently, the CPU 42 calculates the purge execution end timing of each cylinder 2 by subtracting the reaching-the-injection-range time from the fuel injection timing calculated in S1307. Then, the CPU 42 calculates a time (a valve opening time of the electromagnetic valve 39) needed for introducing the purge gas quantity per cylinder calculated in S1305 into the helical port 7*b* from the purge passageway 49, and also calculates the purge execution start timing by subtracting the valve opening time of the electromagnetic valve 39 from the purge execution end timing. Then, the CPU 42 stores the purge execution start timing and the purge execution end timing of each cylinder 2, in the predetermined areas of the RAM 44, and finishes the execution of this routine.

Further, if the combustion mode of the internal combustion engine 1 is the stratified charge combustion or the weak stratified charge combustion, and if "2" is set in the purge mode identification flag, the CPU 42, based on the engine rotational speed, the intake air quantity, the opening degree of the throttle valve, and the opening degree of the swirl control valve serving as the parameters, accesses the reaching-the-injection-range time control map in the ROM 43, and calculates a reaching-the-injection-range time. Then, the CPU 42 calculates the pre-reaching-the-injection-range time by subtracting the fuel injection time from the calculated reaching-the-injection-range time.

Subsequently, the CPU 42 calculates the purge execution end timing by subtracting the pre-reaching-the-injection-range time from the fuel injection timing calculated in S1307. Furthermore, the CPU 42, based on the engine rotational speed, the intake air quantity, the opening degree of the throttle valve, and the opening degree of the swirl control valve serving as the parameters, calculates a time (a valve opening time of the electromagnetic valve 39) needed for the purging of the purge gas quantity, and also calculates the purge execution start timing by subtracting the valve opening time of the electromagnetic valve 39 from the purge execution end timing. Then, the CPU 42 stores the purge execution start timing and the purge execution end timing of each cylinder 2, in the predetermined areas of the RAM 44, and finishes the execution of this routine.

Moreover, if the combustion mode of the internal combustion engine 1 is the stratified charge combustion or the weak stratified charge combustion, and if "3" is set in the purge mode identification flag, the CPU 42, after changing the combustion mode of the internal combustion engine 1 to the uniform combustion from the stratified charge combustion (the weak stratified charge combustion), synchronizes the purge execution timing with the fuel injection timing.

On the other hand, the CPU 42 performs the purging of the vapor fuel by executing the purge execution control routine explained in the above-described first embodiment each time when the crank position sensor 13 outputs the signal.

According to the second embodiment discussed above, it is feasible to purge the vapor fuel without disturbing the stratified state of the air-fuel mixture not only when the internal combustion engine 1 is in the operational state of the uniform combustion, but also when the internal combustion engine 1 is in the operational state of the stratified charge combustion. Further, the purging mode is changed according to the concentration of the vapor fuel, thereby enhancing the stability of the combustion state during the purge execution.

Note that the first and second embodiments have been described by way of an example of having the purge port connected to the helical port. However, the purge port may be connected to the straight port. In this case, if the purge port is connected to the straight port disposed downstream of the swirl control valve, then when the opening degree of the swirl control valve decreases as seen at the time of the stratified charge combustion operation or the uniform lean-burn operation, a high negative pressure is produced downstream of the swirl control valve, and, therefore, the differential pressure produced between the upstream side and the downstream side of the purge passageway increases, whereby the sufficient purge quantity can be ensured.

Namely, the throttle valve is substantially fully opened as at the time of the stratified charge combustion operation or the uniform lean-burn operation, and, even when the sufficient negative pressure in the intake pipe can not be obtained, by connecting the purge passageway with the downstream-portion of the swirl control valve, the differential pressure between the upstream-side and the downstream-side of the purge passageway is increased, and the ample purge quantity can be ensured.

On the other hand, when the purge port is provided at the straight port disposed downstream of the swirl control valve, the purge gas purged at the straight port moves in the state of the partially-concentrated gas along the swirl flow within the combustion chamber, and, therefore, the same effects as those in the first and second embodiments can be obtained.

Moreover, in the first and second embodiments, swirl flow generating means has been described by way of an example of a configuration made by combining the helical port with the swirl control valve according to the present invention, but the swirl flow generating means is not limited to this arrangement. For example, there may be adopted a tumble port having a flow path so formed as to swirl around in the axial direction of the cylinder, or means configured of a combination of the tumble port with the swirl control valve, or means for generating a swirl flow by opening only one of the two intake valves disposed in each cylinder.

Further, in the case where the internal combustion engine 1 includes a variable valve timing mechanism capable of changing an opening/closing timing of at least one of the intake valve and the exhaust valve, it is preferable that the purge execution timing be set asynchronous with an overlap timing of the intake valve with the exhaust valve. This is because if the purging is executed at the overlap timing, the purge gas flows back to the intake passageway or flows out to the exhaust passageway, which might cause disturbance to the air/fuel ratio and deteriorate the emission of the exhaust gas to out of the allowable level.

Moreover, the first and second embodiments have exemplified the case where the vapor fuels to all the cylinders are purged during the stratified charge combustion. However, only a predetermined number of cylinders (e.g., only one cylinder) may be operated in the uniform combustion, and the vapor fuel may be purged in only this cylinder.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of processing a vapor fuel of a lean-burn internal combustion engine, comprising the steps of:

guiding a vapor fuel generated in a fuel tank provided in combination in said lean-burn internal combustion engine, to an intake passageway of said lean-burn internal combustion engine;

generating a swirl flow of intake air, ranging from said intake passageway to a combustion chamber; and forming a partially-concentrated gas containing the vapor fuel in said combustion chamber by supplying said combustion chamber with the vapor fuel guided to said intake passageway along the intake air swirl flow.

2. An apparatus for processing a vapor fuel of a lean-burn internal combustion engine, comprising:

a lean-burn internal combustion engine capable of burning an air-fuel mixture which is in an over-oxygen state;

purge means for guiding a vapor fuel generated in a fuel tank provided in combination in said lean-burn internal combustion engine, to an intake passageway of said lean-burn internal combustion engine;

swirl flow generating means for generating a swirl flow of intake air, ranging from said intake passageway to a combustion chamber; and partially-concentrated gas forming means for forming a partially-concentrated gas containing the vapor fuel in said combustion chamber by supplying an interior of said combustion chamber with the vapor fuel guided to said intake passageway along the intake air swirl flow.

3. An apparatus for processing a vapor fuel of a lean-burn internal combustion engine according to claim 2, further comprising:

fuel supply state control means for controlling at least one of said purge means and said fuel injection valve in order to mix the partially-concentrated gas with the fuel injected from said fuel injection valve.

4. An apparatus for processing a vapor fuel of a lean-burn internal combustion engine according to claim 2, further comprising:

vapor fuel concentration detecting means for detecting a concentration of the vapor fuel; and fuel supply state control means for controlling, if the concentration detected by said vapor fuel concentration detecting means is less than a predetermined concentration, at least one of said purge control means and said fuel injection valve in order to mix the partially-concentrated gas with the fuel injected from said fuel injection valve, and controlling, if the concentration detected by said vapor fuel concentration detecting means is over the predetermined concentration, at least one of said purge control means and said fuel injection valve in order to form a partially-concentrated gas that the above partially-concentrated gas and the fuel injected from said fuel injection valve are independent of each other.

5. An apparatus for processing a vapor fuel of a lean-burn internal combustion engine according to claim 2, further comprising:

vapor fuel concentration detecting means for detecting a concentration of the vapor fuel; and purge restricting means for restricting the purging of the vapor fuel when the concentration detected by said vapor fuel concentration detecting means is over a predetermined concentration.

6. An apparatus for processing a vapor fuel of a lean-burn internal combustion engine according to claim 2, further comprising:

vapor fuel concentration detecting means for detecting a concentration of the vapor fuel; and combustion mode changing means for changing a combustion mode of said lean-burn internal combustion engine, when the concentration detected by said vapor fuel concentration detecting means is over a predetermined concentration.

7. An apparatus for processing a vapor fuel of a lean-burn internal combustion engine according to claim 2, further comprising:

swirl flow generating means for generating a swirl flow of intake air in said combustion chamber, wherein said purge control means controls the purging of the vapor fuel in accordance with a state of the swirl flow.

8. An apparatus for processing a vapor fuel of a lean-burn internal combustion engine according to claim 7, wherein said purge control means controls a purge execution timing of the vapor fuel in accordance with an intensity of the swirl flow generated by said swirl flow generating means.

9. An apparatus for processing a vapor fuel of a lean-burn internal combustion engine according to claim 2, further comprising:

a variable valve timing mechanism for making variable an opening/closing timing of at least one of an intake valve and an exhaust valve, wherein said purge control means changes over the purge execution timing in accordance with an overlap timing of said intake valve with said exhaust valve.

10. An apparatus for processing a vapor fuel of a lean-burn internal combustion engine according to claim 9, wherein said purge control means changes over the purge execution timing so that the overlap timing is asynchronous with the purge execution timing.

11. An apparatus for processing a vapor fuel of a lean-burn internal combustion engine according to claim 2, wherein said lean-burn internal combustion engine is a cylinder fuel injection type internal combustion engine including a fuel injection valve for injecting the fuel directly into said combustion chamber.

12. An apparatus for processing a vapor fuel of a lean-burn internal combustion engine, comprising:

a lean-burn internal combustion engine capable of burning an air-fuel mixture which is in an over-oxygen state;

purge control means for guiding a vapor fuel generated in a fuel tank provided in combination in said lean-burn internal combustion engine, to a purge port provided at an intake passageway of said lean-burn internal combustion engine;

vapor fuel concentration detecting means for detecting a concentration of the vapor fuel; and fuel supply state control means for controlling, if the concentration detected by said vapor fuel concentration detecting means is less than a predetermined concentration, at least one of said purge control means and said fuel injection valve in order to mix the partially-concentrated gas with the fuel injected from said fuel injection valve, and controlling, if the concentration detected by said vapor fuel concentration detection means is over the predetermined concentration, at least one of said purge control means and said fuel injection valve so as to form a partially-concentrated gas that the above partially-concentrated gas and the fuel injected from said fuel injection valve are independent of each other, wherein said purge port is disposed in a position in which the vapor fuel guided by said purge control means is not mixed with intake air and a partially-concentrated gas is formed in said combustion chamber of said lean-burn internal combustion engine.

13. An apparatus for processing a vapor fuel of a lean-burn internal combustion engine, comprising:

a lean-burn internal combustion engine capable of burning and air-fuel mixture which is in an over-oxygen state;

purge control means for guiding a vapor fuel generated in a fuel tank provided in combination in said lean-burn internal combustion engine, to a purge port provided at an intake passageway of said lean-burn internal combustion engine;

vapor fuel concentration detecting means for detecting a concentration of the vapor fuel; and purge restricting means for restricting the purging of the vapor fuel when the concentration detected by said vapor fuel concentration detecting means is over a predetermined concentration, wherein said purge port is disposed in a position in which the vapor fuel guided by said purge control means is not mixed with intake air and a partially-concentrated gas is formed in said combustion chamber of said lean-burn internal combustion engine.

14. An apparatus for processing a vapor fuel of a lean-burn internal combustion engine, comprising:

a lean-burn internal combustion engine capable of burning an air-fuel mixture which is in an over-oxygen state;

purge control means for guiding a vapor fuel generated in a fuel tank provided in combination in said lean-burn internal combustion engine, to a purge port provided at an intake passageway of said lean-burn internal combustion engine;

vapor fuel concentration detecting means for detecting a concentration of the vapor fuel; and combustion mode changing means for changing a combustion mode of said lean-burn internal combustion engine when the concentration detected by said vapor fuel concentration detecting means is over a predetermined concentration, wherein said purge port is disposed in a position in which the vapor guided by said purge control means is not mixed with intake air and a partially-concentrated gas is formed in said combustion chamber of said lean-burn internal combustion engine.

15. An apparatus for processing a vapor fuel of a lean-burn internal combustion engine, comprising:

a lean-burn internal combustion engine capable of burning an air-fuel mixture which is in an over-oxygen state;

purge control means for guiding a vapor fuel generated in a fuel tank provided in combination in said lean-burn internal combustion engine, to a purge port provided at an intake passageway of said lean-burn internal combustion engine; and swirl flow generating means for generating a swirl flow of intake air within said combustion chamber, wherein said purge control means controls the purging of the vapor fuel in accordance with a state of the swirl flow and said purge port is disposed in a position in which the vapor fuel guided by said purge control means is not mixed with intake air and a partially-concentrated gas is formed in said combustion chamber of said lean-burn internal combustion engine.

16. An apparatus for processing a vapor fuel of a lean-burn internal combustion engine according to claim 15, wherein said purge control means controls a purge execution timing of the vapor fuel in accordance with an intensity of the swirl flow generated by said swirl flow generating means.

17. An apparatus for processing a vapor fuel of a lean-burn internal combustion engine, comprising:

a lean-burn internal combustion engine capable of burning an air-fuel mixture which is in an over-oxygen state;

purge control means for guiding a vapor fuel generated in a fuel tank provided in combination in said lean-burn internal combustion engine, to a purge port provided at an intake passageway of said lean-burn internal combustion engine; and a variable valve timing mechanism for making variable an opening/closing timing of at least one of an intake valve and an exhaust valve, wherein said purge control means changes over the purge execution timing in accordance with an overlap timing of said intake valve with said exhaust valve and said purge port is disposed in a position in which the vapor fuel guided by said purge control means is not mixed with intake air partially-concentrated gas formed in said combustion chamber of said lean-burn internal combustion engine.

18. An apparatus for processing a vapor fuel of a lean-burn internal combustion engine according to claim 17, wherein said purge control means changes over the purge execution timing so that the overlap timing is asynchronous with the purge execution timing.

19. An apparatus for processing a vapor fuel of a lean-burn internal combustion engine, comprising:

a lean-burn internal combustion engine including a plurality of cylinders and capable of burning an air-fuel mixture which is in an over-oxygen state;

a swirl flow generating structure in an intake passageway outside a combustion chamber of each of the plurality of cylinders for introducing an intake air to the combustion chamber; and purge control means for guiding a vapor fuel generated in a fuel tank provided in combination in said lean-burn internal combustion engine, to an intake passageway of said lean-burn internal combustion engine, wherein said purge control means supplies the vapor fuel to only a specified cylinder among said plurality of cylinders.

20. An apparatus for processing a vapor fuel of a lean-burn internal combustion engine according to claim 19, further comprising a fuel injection valve for injecting the fuel directly into said combustion chamber.

* * * * *